US012619524B2

(12) United States Patent
Um et al.

(10) Patent No.: US 12,619,524 B2
(45) Date of Patent: May 5, 2026

(54) STORAGE CONTROLLER FOR NON-VOLATILE MEMORY DEVICE INCLUDING TRIM COMMAND AND MAPPING INVALIDATION

(71) Applicant: Samsung Electronics Co., Ltd., Suwon-si (KR)

(72) Inventors: Kyungsik Um, Suwon-si (KR); Jongmin Kim, Suwon-si (KR); Minsik Oh, Suwon-si (KR); Donggil Kang, Suwon-si (KR); Kyungjune Cho, Suwon-si (KR); Yoon soo Kim, Suwon-si (KR); MyungGwan Jeong, Suwon-si (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 0 days.

(21) Appl. No.: 18/799,102

(22) Filed: Aug. 9, 2024

(65) Prior Publication Data

US 2025/0225066 A1      Jul. 10, 2025

(30) Foreign Application Priority Data

Jan. 5, 2024      (KR) ........................ 10-2024-0002419

(51) Int. Cl.
G06F 12/02      (2006.01)
G06F 12/10      (2016.01)
(52) U.S. Cl.
CPC .......... G06F 12/0223 (2013.01); G06F 12/10 (2013.01)

(58) Field of Classification Search
CPC .. G06F 12/0223; G06F 12/10; G06F 12/0246; G06F 2212/2022; G06F 2212/7201; G06F 12/00
USPC ................ 711/103, E12.008, 154, 202, 206, 711/E12.014
See application file for complete search history.

(56) References Cited

U.S. PATENT DOCUMENTS 9,032,138 B2      5/2015   Choi et al.
9,927,985 B2      3/2018   Zhang et al.
10,275,361 B2     4/2019   Ish et al.
(Continued)

FOREIGN PATENT DOCUMENTS

CN            111367836 B      6/2023
KR            10-1824949 B1    2/2018
(Continued)

*Primary Examiner* — Jared I Rutz
*Assistant Examiner* — Edward Waddy, Jr.
(74) *Attorney, Agent, or Firm* — Fish & Richardson P.C.

(57)      ABSTRACT

An operation method of a storage controller configured to control a non-volatile memory device. The method including receiving a first write command for a first logical address included in a first logical address range corresponding to a first trim bit from an external host, the first trim bit being in an activated state when the first write command is received, performing a first mapping invalidation for the first logical address range in response to the first write command, before the first mapping invalidation is complete, receiving a second write command corresponding to a second logical address included in the first logical address range from the host, skipping a second mapping invalidation corresponding to the second write command, and after the first mapping invalidation is complete, performing a mapping update for the second logical address.

20 Claims, 14 Drawing Sheets

(56) References Cited

U.S. PATENT DOCUMENTS

| | | | |
|---|---|---|---|
| 10,289,500 | B2 | 5/2019 | Hands |
| 11,675,537 | B2 | 6/2023 | Kim et al. |
| 2015/0363425 | A1* | 12/2015 | Li ........................ G06F 16/2365 |
| | | | 707/690 |
| 2022/0237115 | A1* | 7/2022 | Seo ...................... G06F 12/0253 |
| 2023/0085675 | A1* | 3/2023 | Kawahara ........... G06F 12/0891 |
| | | | 711/133 |
| 2023/0152968 | A1* | 5/2023 | Kim ...................... G06F 3/0619 |
| | | | 711/103 |
| 2023/0154529 | A1 | 5/2023 | Shin et al. |

FOREIGN PATENT DOCUMENTS

| | | | |
|---|---|---|---|
| KR | 10-2022-0067797 | A | 5/2022 |
| KR | 10-2545465 | B1 | 6/2023 |

* cited by examiner

FIG. 2

Trim target address: ▨

FIG. 4A

Trim target LPN:

Mapping invalidation/ Mapping update

Trim target LPN:

STORAGE CONTROLLER FOR NON-VOLATILE MEMORY DEVICE INCLUDING TRIM COMMAND AND MAPPING INVALIDATION

CROSS-REFERENCE TO RELATED APPLICATIONS

This application claims priority under 35 U.S.C. § 119 to Korean Patent Application No. 10-2024-0002419 filed on Jan. 5, 2024, in the Korean Intellectual Property Office, the disclosures of which are incorporated by reference herein in their entireties.

BACKGROUND

Example embodiments of the present inventive concepts described herein relate to semiconductor memories, and more particularly, relate to storage controllers configured to control non-volatile memory devices, operation methods thereof, and storage devices including the storage controllers.

A semiconductor memory is classified as a volatile memory, which loses data stored therein when power is turned off, such as a static random access memory (SRAM) or a dynamic random access memory (DRAM) or a non-volatile memory, which retains data stored therein even when power is turned off, such as a flash memory, a phase-change RAM (PRAM), a magnetic RAM (MRAM), a resistive RAM (RRAM), or a ferroelectric RAM (FRAM).

A host uses a memory and a storage device. When a file is deleted by the host, the host may not erase data corresponding to the file and may mark the data to indicate an un-use state. Even though the host marks the data to indicate the un-use state, the storage device may recognize the data corresponding to the deleted file as valid data.

Accordingly, the host may transmit, provide, or send a trim command to the storage device. The trim command may be a command for providing notification that the data corresponding to the deleted file are invalid data. The storage device may recognize the data corresponding to the deleted file as invalid data in response to the trim command. For improvement of performance, it may be advantageous to provide a storage device which processes the trim command at high speed.

SUMMARY

Example embodiments of the present inventive concepts provide storage controllers configured to control non-volatile memory devices, operation methods thereof, and storage devices including the storage controllers.

According to some example embodiments, an operation method of a storage controller configured to control a non-volatile memory device includes receiving a first write command for a first logical address included in a first logical address range corresponding to a first trim bit from an external host, the first trim bit being in an activated state when the first write command is received; performing a first mapping invalidation for the first logical address range in response to the first write command; before the first mapping invalidation is complete, receiving a second write command corresponding to a second logical address included in the first logical address range from the host; skipping a second mapping invalidation corresponding to the second write command; and after the first mapping invalidation is complete, performing a mapping update for the second logical address.

According to some example embodiments, a storage device includes a non-volatile memory device, and a storage controller configured to control the non-volatile memory device. The storage controller configured to receive a first write command for a first logical address included in a first logical address range corresponding to a first trim bit from an external host, perform a first mapping invalidation for the first logical address range in response to the first write command, receive a second write command corresponding to a second logical address included in the first logical address range from the host before the first mapping invalidation is complete, skip a second mapping invalidation corresponding to the second write command, and perform a mapping update for the second logical address after the first mapping invalidation is complete.

According to some example embodiments, an operation method of a storage controller configured to communicate with a host and a non-volatile memory device includes activating a first trim bit corresponding to a first logical address range in response to a trim command from the host; receiving a first write command for a first logical address included in the first logical address range from the host; initiating a first mapping invalidation for the first logical address range in response to the first write command; before the first mapping invalidation is complete, receiving a second write command corresponding to a second logical address included in the first logical address range from the host; when the second write command is received, skipping a second mapping invalidation corresponding to the second write command, based on the first trim bit being in an activated state and the first mapping invalidation not being complete; completing the first mapping invalidation and performing a first mapping update for the first logical address; and after the first mapping update is complete, performing a mapping update for the second logical address.

BRIEF DESCRIPTION OF THE DRAWINGS

The above and other objects and features of the present inventive concepts will become apparent by describing in detail some example embodiments thereof with reference to the accompanying drawings.

FIG. 2 is a diagram illustrating a storage controller of FIG. 1, according to some example embodiments.

FIGS. 4A and 4B are diagrams describing an operation of a storage controller of FIG. 1 when the storage controller receives a write command according to some example embodiments.

DETAILED DESCRIPTION

Below, some example embodiments of the present inventive concepts will be described in detail and clearly to such an extent that one skilled in the art easily carries out the present inventive concepts.

In the specification, functional blocks, which respectively correspond to the terms "block", "unit", "logic", etc., may be implemented in the form of software, hardware, or a combination thereof.

Figure 1:
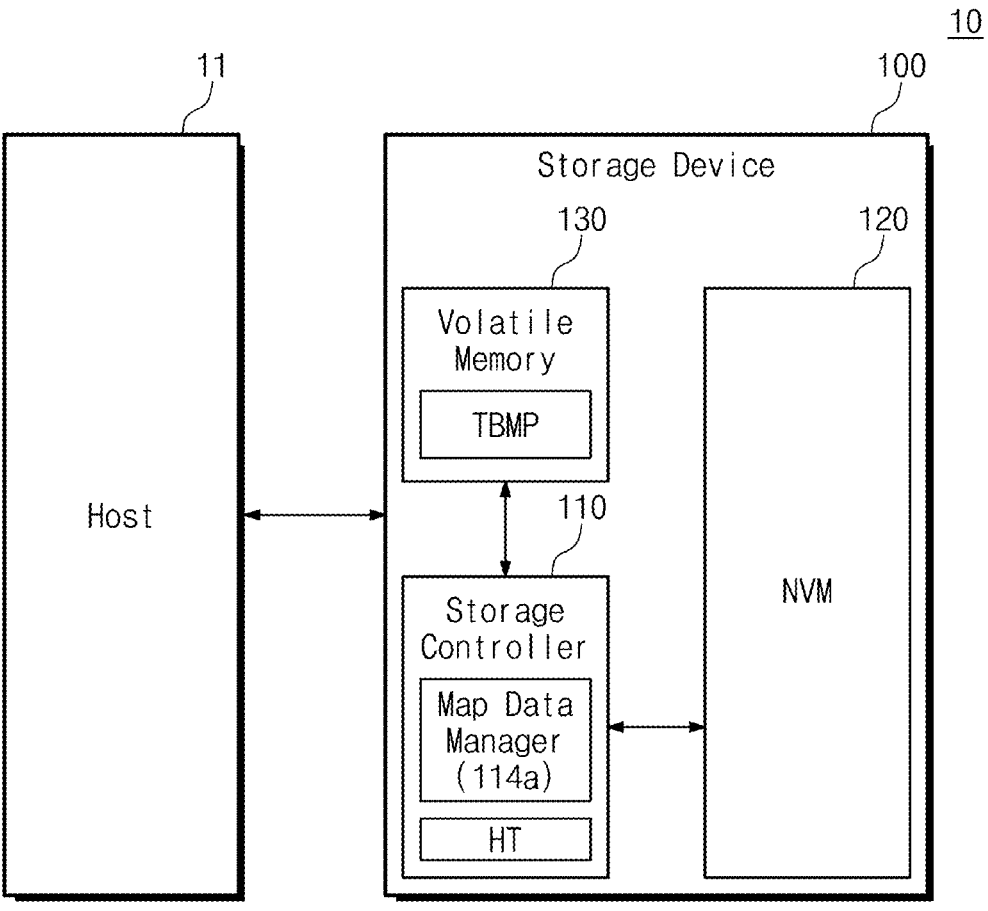
FIG. 1 is a block diagram of a storage system according to some example embodiments.

FIG. 1 is a block diagram of a storage system according to some example embodiments. Referring to FIG. 1, a storage system 10 may include a host 11 and a storage device 100. In some example embodiments, the storage system 10 may refer to a computing system, which is configured to process a variety of information, such as a personal computer (PC), a notebook, a laptop, a server, a workstation, a tablet PC, a smartphone, a digital camera, and a black box, but example embodiments are not limited thereto.

The host 11 may control an overall operation of the storage system 10. For example, the host 11 may store data in the storage device 100 or may read data stored in the storage device 100.

The storage device 100 may include a storage controller 110, a non-volatile memory device (NVM) 120, and a volatile memory device 130. The non-volatile memory device 120 may store data. The storage controller 110 may store data in the non-volatile memory device 120 or may read data stored in the non-volatile memory device 120. The volatile memory device 130 may be used as an external buffer memory of the storage device 100. The non-volatile memory device 120 may operate under control of the storage controller 110. For example, based on a command CMD indicating an operation and an address indicating a location of data, the storage controller 110 may store data in the non-volatile memory device 120 or may read data stored in the non-volatile memory device 120.

An example in which the volatile memory device 130 exists outside the storage controller 110 is illustrated in FIG. 1, but example embodiments are not limited thereto. For example, the volatile memory device 130 may be present in the storage controller 110.

In some example embodiments, the non-volatile memory device 120 may be a NAND flash memory device, but example embodiments are not limited thereto. For example, the non-volatile memory device 120 may be one of various storage devices, which retain data stored therein even when power is turned off, such as a phase-change random access memory (PRAM), a magnetic random access memory (MRAM), a resistive random access memory (RRAM), and a ferroelectric random access memory (FRAM).

The volatile memory device 130 may include a random access memory. For example, the volatile memory device 130 may include at least one of a dynamic random access memory, a phase-change random access memory, a ferroelectric random access memory, a magnetic random access memory, and a resistive random access memory.

The volatile memory device 130 may include a trim bitmap TBMP. For example, the volatile memory device 130 may be configured to store the trim bitmap TBMP. In some example embodiments, the trim bitmap TBMP may include a plurality of trim bits. Each of the plurality of trim bits may indicate whether data corresponding to a relevant logical address range among a plurality of logical address ranges are invalid data. Each of the logical address ranges may include at least two logical addresses. The trim bitmap TBMP will be described in detail with reference to FIG. 3.

In some example embodiments, the host 11 may execute an operating system (OS) supporting a file system. The host 11 may delete a file which is being used. As the file is deleted, the host 11 may transmit, send, or provide, to the storage device 100, a trim command for invalidating data of the non-volatile memory device 120, which corresponds to the deleted file. For example, the trim command may include information about logical addresses (e.g., trim target addresses) corresponding to the data of the deleted file. The storage device 100 may manage data of the non-volatile memory device 120, which corresponds to the data of the deleted file, as invalid data in response to the trim command.

In some example embodiments, the storage controller 110 may include a map data manager 114a and a hazard table HT.

The map data manager 114a may perform mapping invalidation for trim target addresses in response to the trim command from the host 11. For example, the mapping invalidation may include an operation of removing (or unmapping) a mapping relationship between a logical address and a physical address.

The mapping invalidation operation may be referred to as an "unmap operation". The map data manager 114a may identify a logical address targeted for mapping invalidation based on the trim bitmap TBMP and may perform the mapping invalidation.

According to some example embodiments, the map data manager 114a may perform a mapping update for a logical address corresponding to a write command in response to the write command. For example, the map data manager 114a may perform the mapping update by mapping the logical address corresponding to the write command to a physical address at which write data are to be stored.

The hazard table HT may include information about logical addresses with a probability of hazard occurrence. For example, the hazard table HT may include information of logical addresses targeted for mapping invalidation by the write command. In some example embodiments, the storage device 100 may receive the write command for a logical address included in trim target addresses before performing the mapping invalidation for the trim target addresses. In some example embodiments, the map data manager 114a may store information about the trim target addresses in the hazard table HT.

For example, logical addresses included in a first logical address range among a plurality of logical address ranges may be the trim target addresses. The storage device 100 may receive a first write command from the host 11 before performing the mapping invalidation for the trim target addresses. A write target logical address of the first write command may be a first logical address included in the first logical address range.

In some example embodiments, the map data manager 114a may initiate first mapping invalidation for the first logical address range in response to the first write command.

The first mapping invalidation may mean mapping invalidation for all the logical addresses included in the first logical address range. The logical addresses included in the first logical address range may include a second logical address.

The storage device 100 may receive the first write command and may then receive a second write command from the host 11 before (e.g., prior to) completing the first mapping invalidation. The second write command may correspond to the second logical address.

For example, the map data manager 114a may initiate second mapping invalidation for the first logical address range in response to the second write command. In some example embodiments, the mapping invalidation for the logical addresses belonging to the first logical address range may be duplicated and performed. In some example embodiments, the hazard may be caused by the second write command.

Figure 4A:
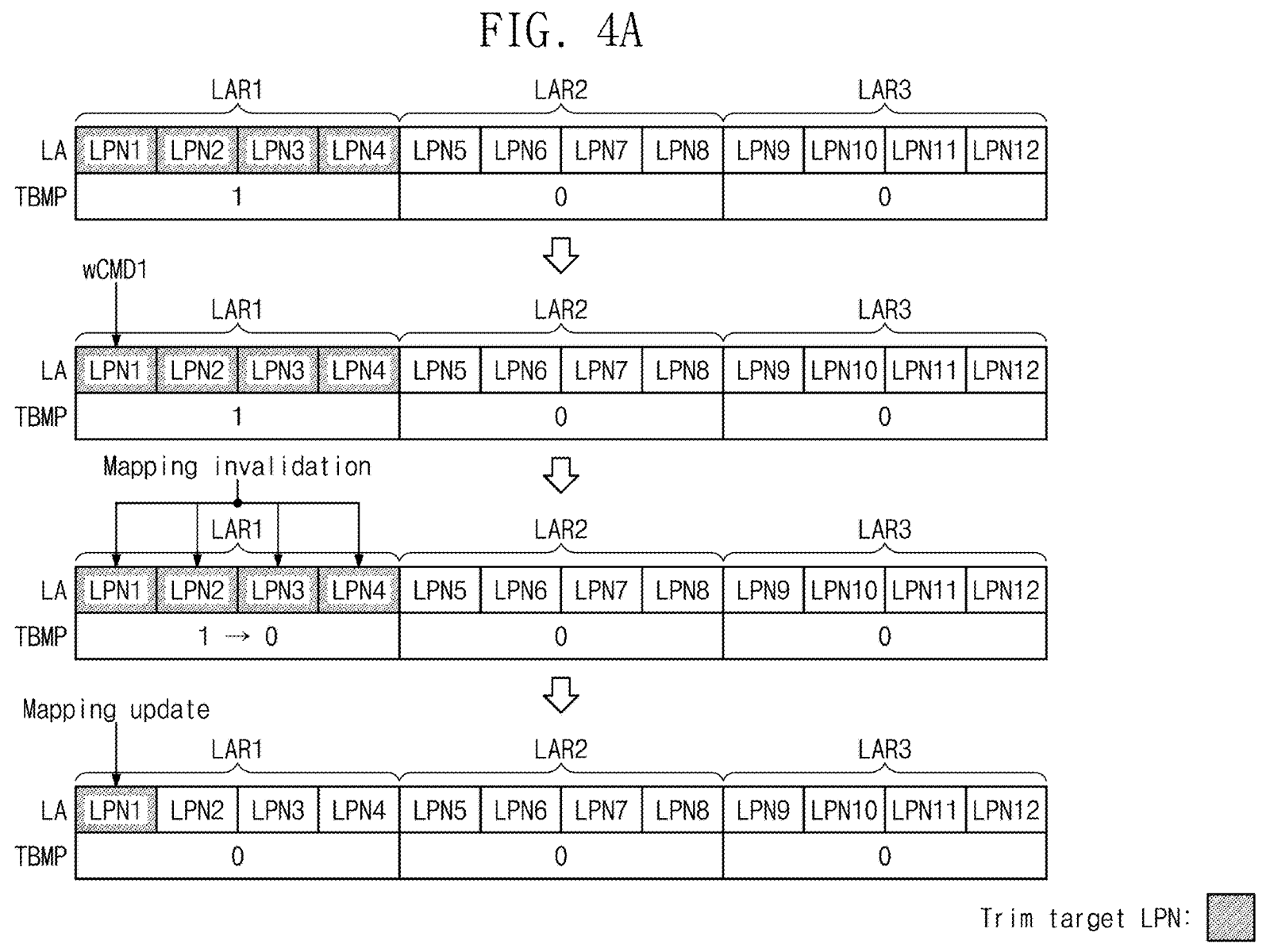
Figure 4B:
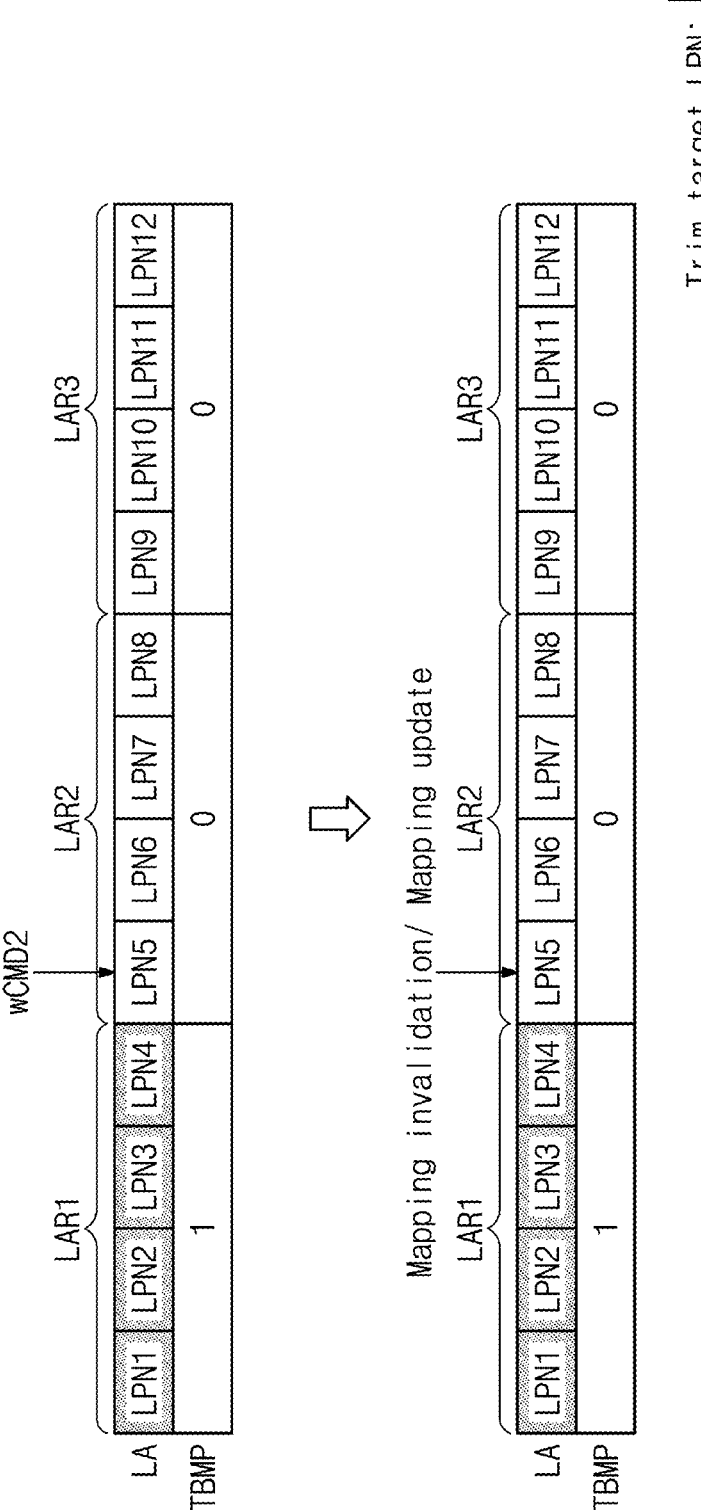

According to some example embodiments, the map data manager 114a may skip mapping invalidation in consideration of the probability that the hazard is capable of being caused by a second write command wCMD2 (e.g., refer to FIG. 4B). For example, the map data manager 114a may check whether information about a logical address belonging to the same logical address range as the second logical address corresponding to the second write command is included in the hazard table HT. In some example embodiments, when the information about the logical address belonging to the same logical address range as the second logical address is included in the hazard table HT and a trim bit corresponding to the second logical address is in an active state, the map data manager 114a may determine that the hazard is capable of being caused by the second write command.

For example, when the second write command is received, the first mapping invalidation for the first logical address range based on the first write command may not be completed. In some example embodiments, when the second write command is received, the hazard table HT may include the information about the second logical address.

For example, when the hazard occurrence is possible, the map data manager 114a may only perform the mapping update for the second logical address without performing the second mapping invalidation based on the second write command wCMD2. In some example embodiments, the duplicated execution of mapping invalidation may be prevented. Accordingly, the performance of the storage device 100 may be improved.

In other words, according to some example embodiments, the storage device 100 may prevent the duplicated execution of mapping invalidation by determining whether the hazard occurrence is possible by referring to the hazard table HT. Accordingly, in some example embodiments, a storage controller configured to control a non-volatile memory device with improved performance, an operation method thereof, and a storage device including the storage controller may be provided. Some example embodiments of the present inventive concepts will be described in detail with reference to the following drawings.

Figure 2:
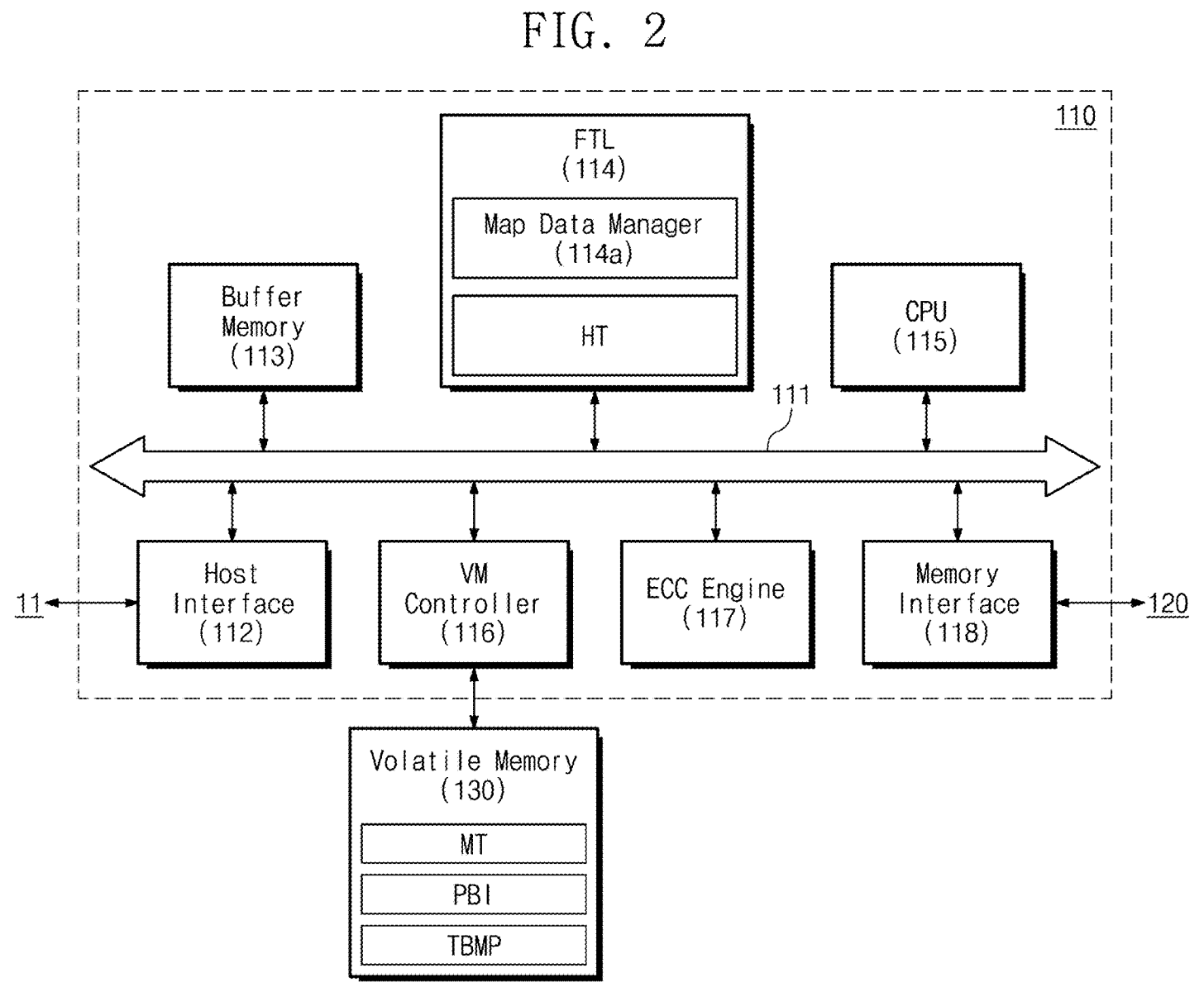

FIG. 2 is a diagram illustrating a storage controller of FIG. 1, according some example embodiments. Referring to FIGS. 1 and 2, the storage controller 110 may include a system bus 111, a host interface 112, a buffer memory 113, a flash translation layer (FTL) 114, a central processing unit (CPU) 115, a volatile memory controller 116, an error correction code (ECC) engine 117, and a memory interface 118.

The system bus 111 may provide communication channels between the components of the storage controller 110. The host interface 112 may receive various requests from an external host device and may parse the received requests. The host interface 112 may store the parsed requests in the buffer memory 113.

The host interface 112 may transmit, provide, or send various responses to the external host device. The host interface 112 may exchange signals with the external host device in compliance with a given communication protocol. For example, the communication protocol may include at least one of protocols for various interfaces such as an advanced technology attachment (ATA) interface, a serial ATA (SATA) interface, an external SATA (e-SATA) interface, a small computer small interface (SCSI) interface, a serial attached SCSI (SAS) interface, a peripheral component interconnection (PCI) interface, a PCI express (PCIe) interface, an NVM express (NVMe) interface, an IEEE 1394, an universal serial bus (USB) interface, a secure digital (SD) card interface, a multi-media card (MMC) interface, an embedded multi-media card (eMMC) interface, a universal flash storage (UFS) interface, an embedded universal flash storage (eUFS) interface, a compact flash (CF) card interface, a compute express link (CXL) interface, and a network interface, but example embodiments are not limited thereto.

The buffer memory 113 may include a random access memory. For example, the buffer memory 113 may include a static random access memory or a dynamic random access memory.

The FTL 114 may be configured to manage address mapping between a logical address from the host 11 and a physical address of the storage device 100. In some example embodiments, the FTL 114 may include the map data manager 114a and the hazard table HT. In some example embodiments, the hazard table HT may be implemented through internal registers of the FTL 114.

The FTL 114 may perform a wear-leveling operation such that the excessive deterioration of a specific memory block among memory blocks of the non-volatile memory device 120 are prevented. The lifetime of the non-volatile memory device 120 may be improved by the wear-leveling operation of the FTL 114. The FTL 114 may perform garbage collection for the non-volatile memory device 120 to secure a free memory block.

In some example embodiments, the FTL 114 may be implemented in the form of software or hardware. For example, where the FTL 114 is implemented in the form of software, a program code or information associated with the FTL 114 may be stored in the volatile memory device 130 and may be executed by the CPU 115. In some example embodiments, when the FTL 114 is implemented in the form of hardware, a hardware accelerator configured to perform the operation of the FTL 114 may be provided independent of the CPU 115. In some example embodiments, the FTL 114 may include or be implemented as processing circuitry such as hardware (e.g., logic circuits) or a combination of hardware and software (e.g., a computer-based electronic system like a processor executing instruction codes or program routines (e.g., a software program).

The CPU 115 may control an overall operation of the storage controller 110. The FTL 114 may perform various operations for efficiently using the non-volatile memory device 120.

Under control of the CPU 115, the volatile memory controller 116 may write data in the volatile memory device 130 or may read data from the volatile memory device 130.

In some example embodiments, the volatile memory device 130 may include a mapping table MT, physical address information PBI, and the trim bitmap TBMP.

In some example embodiments, the mapping table MT may include mapping information between a logical address and a physical address. For example, a logical address LA may indicate a logical page number LPN received from the host 11. The logical page number LPN may indicate a location of data capable of being identified by the host 11. For example, a physical address may indicate a physical page number PPN of a memory block of the non-volatile memory device 120. The physical page number PPN may indicate a location of the non-volatile memory device 120, at which data are stored.

In some example embodiments, the physical address information PBI may include information on whether data stored at a physical address are valid data or invalid data. In some example embodiments, the physical address information PBI may include a valid page count indicating the number of valid pages among a plurality of pages included in each memory block of the non-volatile memory device 120. The trim bitmap TBMP will be described in detail reference to FIG. 3.

The ECC engine 117 may perform error detection and error correction for data read from the non-volatile memory device 120. In some example embodiments, the ECC engine 117 may be implemented as processing circuitry such as hardware (e.g., logic circuits) or a combination of hardware and software (e.g., a computer-based electronic system) like a processor executing instruction codes or program routines (e.g., a software program). For example, the ECC engine 117 may generate an error correction code (or a parity bit) for data to be written in the non-volatile memory device 120. The generated error correction code (or parity bit) may be stored in the non-volatile memory device 120 together with the data to be written. In some example embodiments, when the written data are read from the non-volatile memory device 120, the ECC engine 117 may detect and correct an error of the read data based on the read data and the corresponding error correction code (or the corresponding parity bit).

The memory interface 118 may be configured to communicate with the non-volatile memory device 120 in compliance with a given communication protocol. The memory interface 118 may provide the non-volatile memory device 120 with data to be written in the non-volatile memory device 120 or may receive data read from the non-volatile memory device 120. The memory interface 118 may be implemented to comply with the standard such as Toggle or an open NAND flash interface (ONFI).

In some example embodiments, the map data manager 114a may manage the hazard table HT, the mapping table MT, the physical address information PBI, and the trim bitmap TBMP. For example, the map data manager 114a may update the mapping table MT and the physical address information PBI based on the hazard table HT.

In some example embodiments, the map data manager 114a may perform mapping invalidation when mapping information about a logical address is deleted in the mapping table MT. As the mapping information is deleted, data stored at a physical address corresponding to the deleted logical address may be handled (or managed) as invalid data. In some example embodiments, the mapping invalidation may include marking the physical address information PBI such that data stored at a physical address corresponding to a trim target address are invalid data and changing the valid page count.

In some example embodiments, the volatile memory device 130 and the volatile memory controller 116 may be omitted in the storage device 100. According to some example embodiments, when the volatile memory device 130 and the volatile memory controller 116 are omitted, the functions which are described as being performed by the volatile memory device 130 and the volatile memory controller 116 may be performed by the buffer memory 113.

Figure 3:
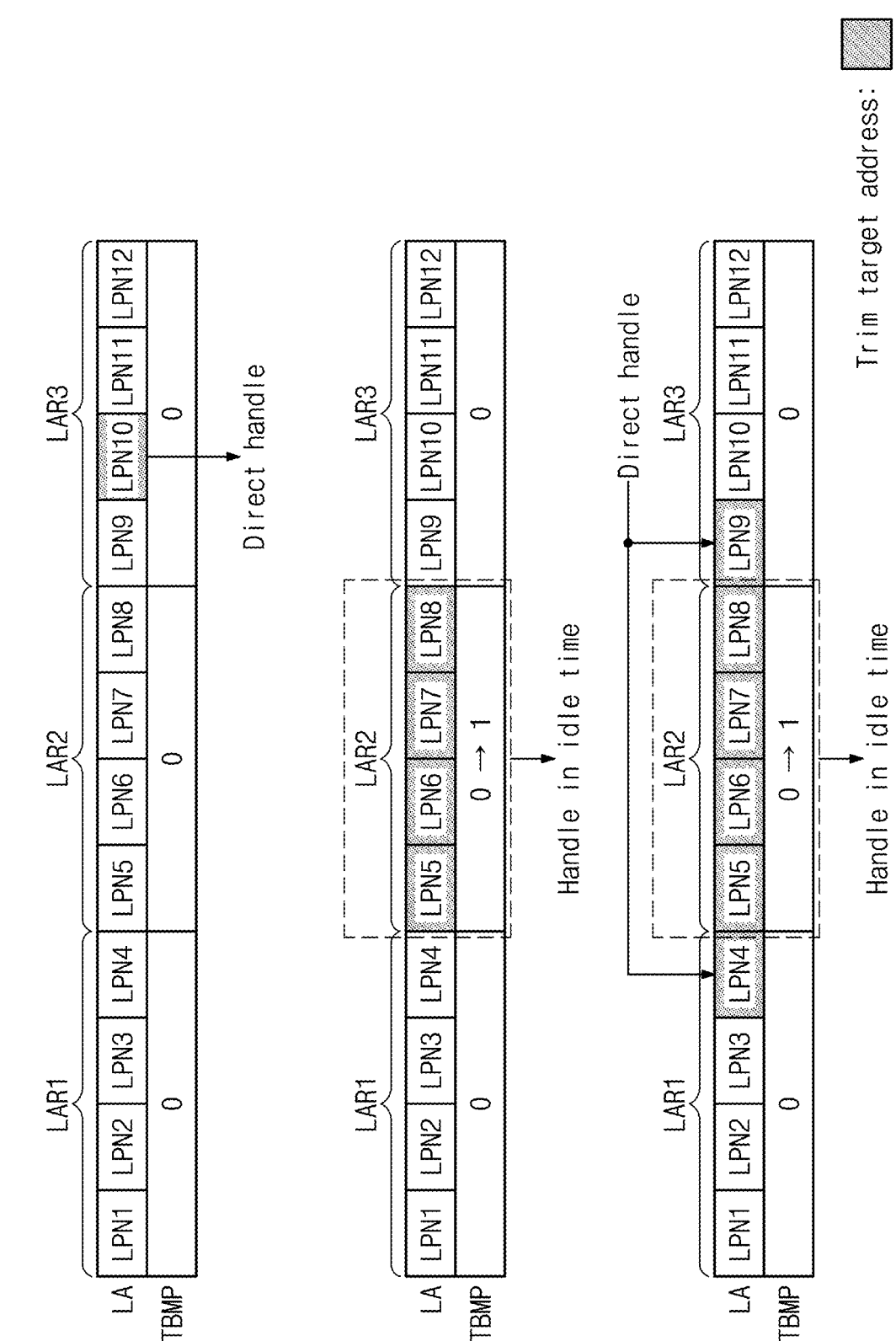
FIG. 3 is a diagram describing an operation of a storage controller associated with a trim bitmap of FIG. 2 according to some example embodiments.

FIG. 3 is a diagram describing an operation of a storage controller, which is associated with a trim bitmap of FIG. 2 according to some example embodiments. Referring to FIG. 3, a plurality of logical addresses LPN1 to LPN12 may be included in a plurality of logical address ranges LAR1 to LAR3. For example, the first logical address range LAR1 may include the first to fourth logical addresses LPN1 to LPN4, the second logical address range LAR2 may include the fifth to eighth logical addresses LPN5 to LPN8, and the third logical address range LAR3 may include the ninth to twelfth logical addresses LPN9 to LPN12. An example in which one logical address range includes four logical addresses is illustrated in FIG. 3 but example embodiments of the present inventive concepts are not limited thereto.

According to some example embodiments, the storage device 100 may include the trim bitmap TBMP including trim bits respectively corresponding to the logical address ranges LAR1 to LAR3. The trim bit may indicate whether the corresponding logical address range is targeted for mapping invalidation. For example, a first trim bit may correspond to the first logical address range LAR1, a second trim bit may correspond to the second logical address range LAR2, and a third trim bit may correspond to the third logical address range LAR3.

The storage controller 110 may receive a trim command TRIM CMD from the host 11. The trim command TRIM CMD may include a trim target address. Based on trim target addresses, the storage controller 110 may manage the trim bitmap TBMP and may perform mapping invalidation.

For example, a trim target address may only include the tenth logical address LPN10. For example, the trim target address LPN10 may not include all the logical addresses (e.g., LPN9 to LPN12) included in one logical address range (e.g., LAR3). In some example embodiments, immediately after the storage controller 110 receives the trim command, the storage controller 110 may perform mapping invalidation for the trim target address (e.g., LPN10) without updating the trim bitmap TBMP.

For example, trim target addresses may include the fifth to eighth logical addresses LPN5 to LPN8. For example, the trim target addresses LPN5 to LPN8 may include all the logical addresses LPN5 to LPN8 included in one logical address range LAR2.

In some example embodiments, immediately after the storage controller 110 receives, the storage controller 110 may not perform mapping invalidation for the trim target addresses LPN5 to LPN8. In some example embodiments, the storage controller 110 may change the trim bit corresponding to the trim target addresses LPN5 to LPN8 from "0" to "1" (or may activate the trim bit corresponding to the trim target addresses LPN5 to LPN8) and may then transmit, provide, or send, to the host 11, a response indicating that the mapping invalidation is completed, without actually performing the mapping invalidation.

Afterwards, in an idle time, the storage controller 110 may perform the mapping invalidation for the trim target addresses LPN5 to LPN8 corresponding to the activated trim bit. After the storage controller 110 completes the mapping invalidation in the idle time, the storage controller 110 may deactivate the trim bit corresponding to the trim target addresses LPN5 to LPN8.

For example, trim target addresses may include the fourth to ninth logical addresses LPN4 to LPN9. For example, some trim target addresses LPN5 to LPN8 among the trim target addresses (e.g., LPN4 to LPN9) may correspond to all the logical addresses included in one logical address range LAR2, and the remaining trim target addresses LPN4 and LPN9 may be logical addresses included in the logical address ranges LAR1 and LAR3. In some example embodiments, immediately after the storage controller 110 receives the trim command, the storage controller 110 may activate the trim bit corresponding to the logical address range LAR2 and may perform mapping invalidation for the logical addresses LPN4 and LPN9. For example, the storage controller 110 may postpone the processing of some (e.g., LPN5 to LPN8) of trim target addresses (e.g., LPN4 to LPN9) and may immediately process the others (e.g., LPN4 and LPN9) of the trim target addresses.

For example, the storage controller 110 may reduce the number of logical addresses, the mapping invalidation of which will be performed immediately after the trim command is received, by utilizing the trim bit. Accordingly, the storage controller 110 may quickly process the trim command. Also, according to some example embodiments, one trim bit may correspond to at least two or more logical addresses. Accordingly, the capacity of the trim bitmap TBMP may be reduced. This may mean that the increase in the costs for manufacturing the storage device 100 is prevented or reduced.

For example, when the trim bit is "0", logical addresses included in a logical address range corresponding to the trim bit may be targeted for mapping invalidation. For convenience of description, that the trim bit is "1" may refer to the activation of the trim bit. In contrast, that the trim bit is "0" may refer to the deactivation of the trim bit. However, the present inventive concepts are not limited thereto.

In some example embodiments, when the storage controller 110 receives the read command for a logical address corresponding to the activated trim bit, even though the storage controller 110 does not actually perform mapping invalidation for a read target logical address, the storage controller 110 may notify the host 11 that data corresponding to the logical address are invalid data. For example, when the trim bit corresponding to a logical address range is activated, the storage controller 110 may manage data corresponding to the logical address range as invalid data.

FIGS. 4A and 4B are diagrams describing an operation of a storage controller of FIG. 1 when the storage controller receives a write command according to some example embodiments. FIGS. 4A and 4B will be described with reference to FIGS. 1 to 3. Referring to FIG. 4A, for example, at a first point in time, the trim bit corresponding to the first logical address range LAR1 may be in a state of being activated based on a previously received trim command (e.g., may be in a state of "1"), and the trim bits respectively corresponding to the second logical address range LAR2 and the third logical address range LAR3 may be in a state of being deactivated (e.g., may be in a state of "0").

Afterwards, at a second point in time, the storage controller 110 may receive a first write command wCMD1 for the first logical address LPN1. The first logical address LPN1 may be included in the first logical address range LAR1. The second point in time may be a point in time when the storage controller 110 does not enter the idle time after the trim bit is activated. For example, the second point in time may be a point in time when mapping invalidation for the first logical address range LAR1 is not performed.

Afterwards, at a third point in time, the storage controller 110 may perform the mapping invalidation for the first logical address range LAR1 in which the first logical address LPN1 is included. For example, the storage controller 110 may sequentially release mapping relationships of the logical addresses LPN1 to LPN4 included in the first logical address range LAR1. After the storage controller 110 completes the mapping invalidation for the first logical address range LAR1, the storage controller 110 may deactivate the trim bit.

For example, at a fourth point in time, the storage controller 110 may perform mapping update for the write target logical address LPN1. For example, the storage controller 110 may perform the mapping update by mapping a new physical address to the write target logical address LPN1.

Meanwhile, in some example embodiments, referring to FIG. 4B, for example, at a first point in time, the storage controller 110 may receive the second write command wCMD2 for the fifth logical address LPN5 from an external host (e.g., 11).

Afterwards, at a second point in time, because the trim bit corresponding to the fifth logical address LPN5 is in a deactivated state, the storage controller 110 may only perform mapping invalidation for the fifth logical address LPN5. After the storage controller 110 completes the mapping invalidation for the fifth logical address LPN5, the storage controller 110 may perform mapping update for the fifth logical address LPN5.

As described above, the storage controller 110 may receive a write command (e.g., wCMD1) for a logical address (e.g., LPN1) corresponding to the activated trim bit. In some example embodiments, the storage controller 110 may perform mapping invalidation for all the logical addresses of a logical address range (LAR1) in which a write target logical address (e.g., LPN1) is included, as well as mapping invalidation for the write target logical address (e.g., LPN1).

In contrast, in some example embodiments the storage controller 110 may receive a write command (e.g., wCMD2) for a logical address (e.g., LPN5) corresponding to the deactivated trim bit. The logical addresses LPN5 to LPN8 corresponding to the deactivated trim bit may not be targeted for mapping invalidation based on the trim command. Accordingly, in in some example embodiments, the storage controller 110 may not perform mapping invalidation for the remaining logical addresses (e.g., LPN6 to LPN8) of a logical address range (e.g., LAR2) other than the write target logical address (e.g., LPN5).

In some example embodiments, unlike the example illustrated in FIG. 4A, the storage controller 110 may perform mapping invalidation for the remaining logical addresses LPN2 to LPN4 other than the first logical address LPN1 corresponding to the first write command wCMD1 and may deactivate the trim bit. After the storage controller 110 deactivates the trim bit, the storage controller 110 may perform mapping invalidation for the first logical address LPN1. Afterwards, the storage controller 110 may perform mapping update for the first logical address LPN1. For example, the storage controller 110 may continuously perform the mapping invalidation and mapping update operations associated with the first logical address LPN1 corresponding to the first write command wCMD1. In some example embodiments, when the storage controller 110 performs the mapping invalidation and mapping update operations, the number of times that the storage controller 110 access a volatile memory device (e.g., 130 of FIG. 1) may be reduced.

For convenience of description and for brevity of drawing, below, as illustrated in FIG. 4A, the description will be given as the trim bit is deactivated after mapping invalidation for all the logical addresses corresponding to the trim bit is completed. However, the present inventive concepts are not limited thereto.

Figure 5A:
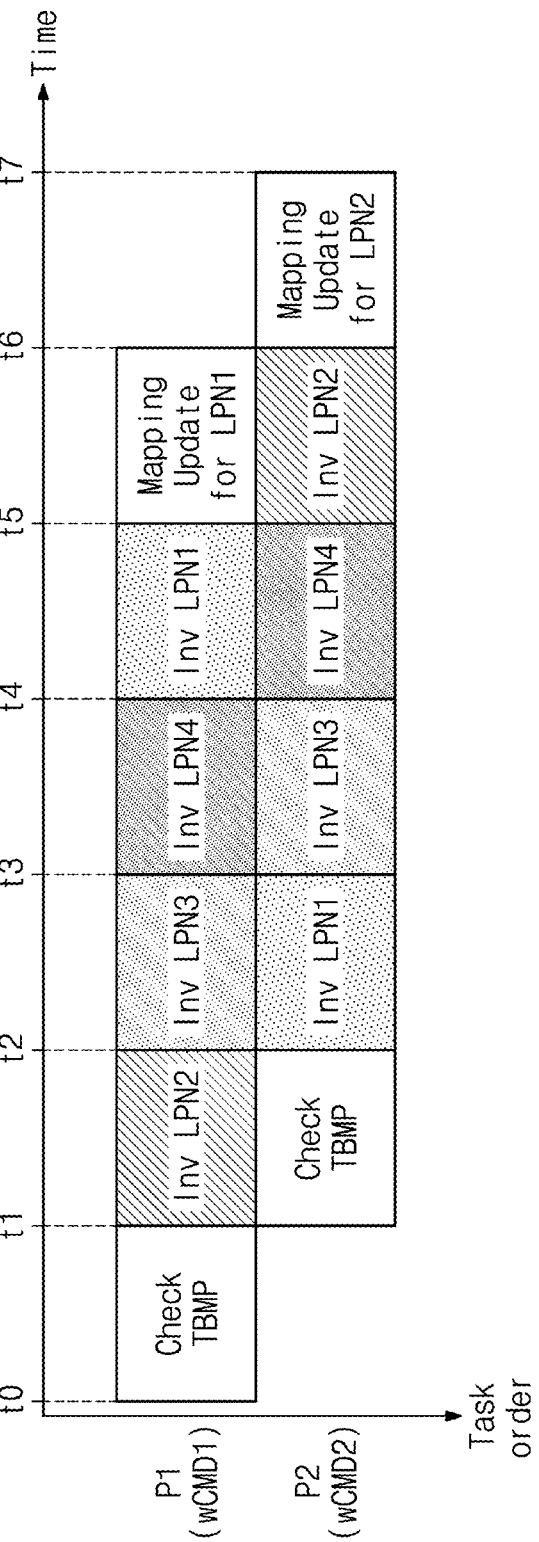
FIGS. 5A and 5B are diagrams describing examples of an operation of a storage controller of FIG. 1 when the storage controller consecutively receives write commands according to some example embodiments.
Figure 5B:
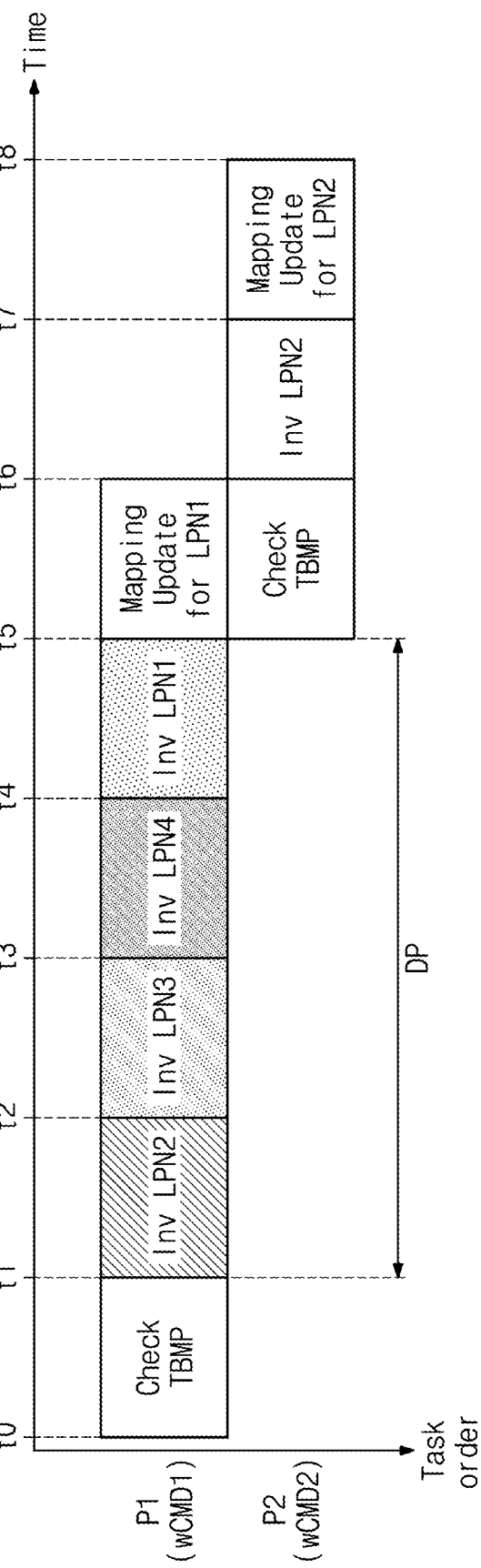

FIGS. 5A and 5B are diagrams describing examples of an operation of a storage controller of FIG. 1 when the storage controller consecutively receives write commands according to some example embodiments. FIGS. 5A and 5B will be described with reference to FIGS. 1 to 4B. In graphs of FIGS. 5A and 5B, the horizontal axis represents time, and the vertical axis represents a task order. Referring to FIG. 5A, at a 0-th point in time t0, the storage controller 110 may receive the first write command wCMD1 for the first logical address LPN1 corresponding to the activated trim bit. In some example embodiments, the storage controller 110 may perform a first process P1 during a time period from t0 to t6 in response to the first write command wCMD1.

In some example embodiments, during the time period from t0 to t1, the storage controller 110 may check the trim bitmap TBMP. For example, the storage controller 110 may read the trim bitmap TBMP stored in a volatile memory device (e.g., 130 of FIG. 1) and may check that the trim bit corresponding to the first logical address LPN1 is in an activated state.

Afterwards, during the time period from t1 to t5, the storage controller 110 may perform first mapping invalidation in response to the first write command wCMD1. For example, the storage controller 110 may perform the first mapping invalidation for a logical address range (e.g., LAR1 of FIG. 4A) in which the first logical address LPN1 is included.

The storage controller 110 may perform mapping invalidation for the second logical address LPN2 during the time period from t1 to t2, may perform mapping invalidation for the third logical address LPN3 during the time period from t2 to t3, may perform mapping invalidation for the fourth logical address LPN4 during the time period from t3 to t4, and may perform mapping invalidation for the first logical address LPN1 during the time period from t4 to t5.

In some example embodiments, the storage controller 110 may perform mapping invalidation for the second logical address LPN2 during the time period from t1 to t2, may perform mapping invalidation for the third logical address LPN3 during the time period from t2 to t3, may perform mapping invalidation for the fourth logical address LPN4 during the time period from t3 to t4, and may perform mapping invalidation for the first logical address LPN1 during the time period from t4 to t5. According to some example embodiments, unlike the example illustrated in FIG. 5A, the order of invalidating the logical addresses LPN1 to LPN4 may be changed.

In some example embodiments, at the fifth point in time t5, as the storage controller 110 completes the mapping invalidation for the first logical address LPN1, the storage controller 110 may complete the first mapping invalidation. In some example embodiments, the storage controller 110 may deactivate the trim bit corresponding to the first logical address LPN1.

Afterwards, during the time period from t5 to t6, the storage controller 110 may perform mapping update for the first logical address LPN1.

In some example embodiments, at the first point in time t1, the storage controller 110 may receive the second write command wCMD2 corresponding to the second logical address LPN2. In some example embodiments, as illustrated in FIG. 4A, both the first logical address LPN1 and the second logical address LPN2 may be included in the first logical address range LAR1.

For example, the storage controller 110 may perform a second process P2 during a time period from t1 to t7 in response to the second write command wCMD2. For example, even though the first process P1 based on the first write command wCMD1 is being performed, the storage controller 110 may perform the second process P2 based on the second write command wCMD2.

In some example embodiments, during the time period from t1 to t2, the storage controller 110 may check the trim bitmap TBMP. The storage controller 110 may check whether the trim bit corresponding to the second logical address LPN2 is in an activated state. The trim bit corresponding to the second logical address LPN2 may be the same as the trim bit corresponding to the first logical address LPN1. As described above, the first mapping invalidation may be completed at the fifth point in time t5. Accordingly, the trim bit may be in an activated state during the time period from t1 to t2. For example, the storage controller 110 may check that the trim bit corresponding to the second logical address LPN2 is in an activated state.

In some example embodiments, during the time period from t2 to t6, the storage controller 110 may perform second mapping invalidation for a logical address range (e.g., LAR1 of FIG. 4A) including the second logical address LPN2 in response to the second write command wCMD2.

For example, the storage controller 110 may perform mapping invalidation for the first logical address LPN1 during the time period from t2 to t3, may perform mapping invalidation for the third logical address LPN3 during the time period from t3 to t4, may perform mapping invalidation for the fourth logical address LPN4 during the time period from t4 to t5, and may perform mapping invalidation for the second logical address LPN2 during the time period from t5 to t6. According to some example embodiments, unlike the example illustrated in FIG. 5A, the order of invalidating the logical addresses LPN1 to LPN4 may be changed.

Afterwards, during the time period from t6 to t7, the storage controller 110 may perform mapping update for the second logical address LPN2.

As described above, in some example embodiments, the storage controller 110 may start the execution of the second process P2 even while the first process P1 is executed. In some example embodiments, the mapping invalidation for the logical addresses LPN1 to LPN4 corresponding to the trim bit may be duplicated and performed. Accordingly, the consistency of metadata of the storage controller 110 may be damaged.

Referring to FIG. 5B, the write commands wCMD1 and wCMD2 corresponding to the activated trim bit may be consecutively received. In some example embodiments, unlike the example illustrated in FIG. 5A, until the first mapping invalidation based on the first write command wCMD1 is completed, the storage controller 110 may wait without processing the second write command wCMD2.

For example, when the storage controller 110 consecutively receives the write commands wCMD1 and wCMD2 corresponding to the activated trim bit, the storage controller 110 may determine that the data hazard occurs. In some example embodiments, the storage controller 110 may generate a delay period DP associated with the second write command wCMD2. Accordingly, until the first mapping invalidation is completed, the storage controller 110 may wait without processing the second write command wCMD2.

For example, at the fifth point in time t5, the storage controller 110 may complete the first mapping invalidation and may deactivate the trim bit corresponding to the first logical address LPN1.

Afterwards, during the time period from t5 to t6, the storage controller 110 may perform mapping update for the first logical address LPN1. Also, the storage controller 110 may check the trim bitmap TBMP in response to the second write command wCMD2. The storage controller 110 may check that the trim bit corresponding to the second logical address LPN2 is in a deactivated state.

Because the trim bit is in a deactivated state, as described with reference to FIG. 4B, during the time period from t6 to t7, the storage controller 110 may only perform mapping invalidation for the second logical address LPN2. For example, unlike FIG. 5A, in FIG. 5B, the second mapping invalidation based on the second write command wCMD2 may only include the mapping invalidation for the second logical address LPN2.

Afterwards, during the time period from t7 to t8, the storage controller 110 may perform mapping update for the second logical address LPN2.

Referring to FIG. 5B, after the first mapping invalidation based on the first write command wCMD1 is completed and the trim bit is deactivated, the storage controller 110 may initiate the execution of the second process P2. In some example embodiments, the issue that the mapping invalidation for the logical addresses is duplicated and performed due to the consecutive input of the write commands wCMD1 and wCMD2 may be solved. However, in some example embodiments, such as in FIG. 5B, the operating speed of the storage controller 110 may be slowed due to the delay period DP.

When the write commands wCMD1 and wCMD2 for logical addresses (e.g., LPN1 to LPN4) corresponding to the activated trim bit are consecutively received, a storage controller according to some example embodiments may skip the second mapping invalidation based on the second write command wCMD2. Accordingly, a storage controller configured to control a non-volatile memory device with improved performance, an operation method thereof, and a storage device including the storage controller are provided.

Figure 6:
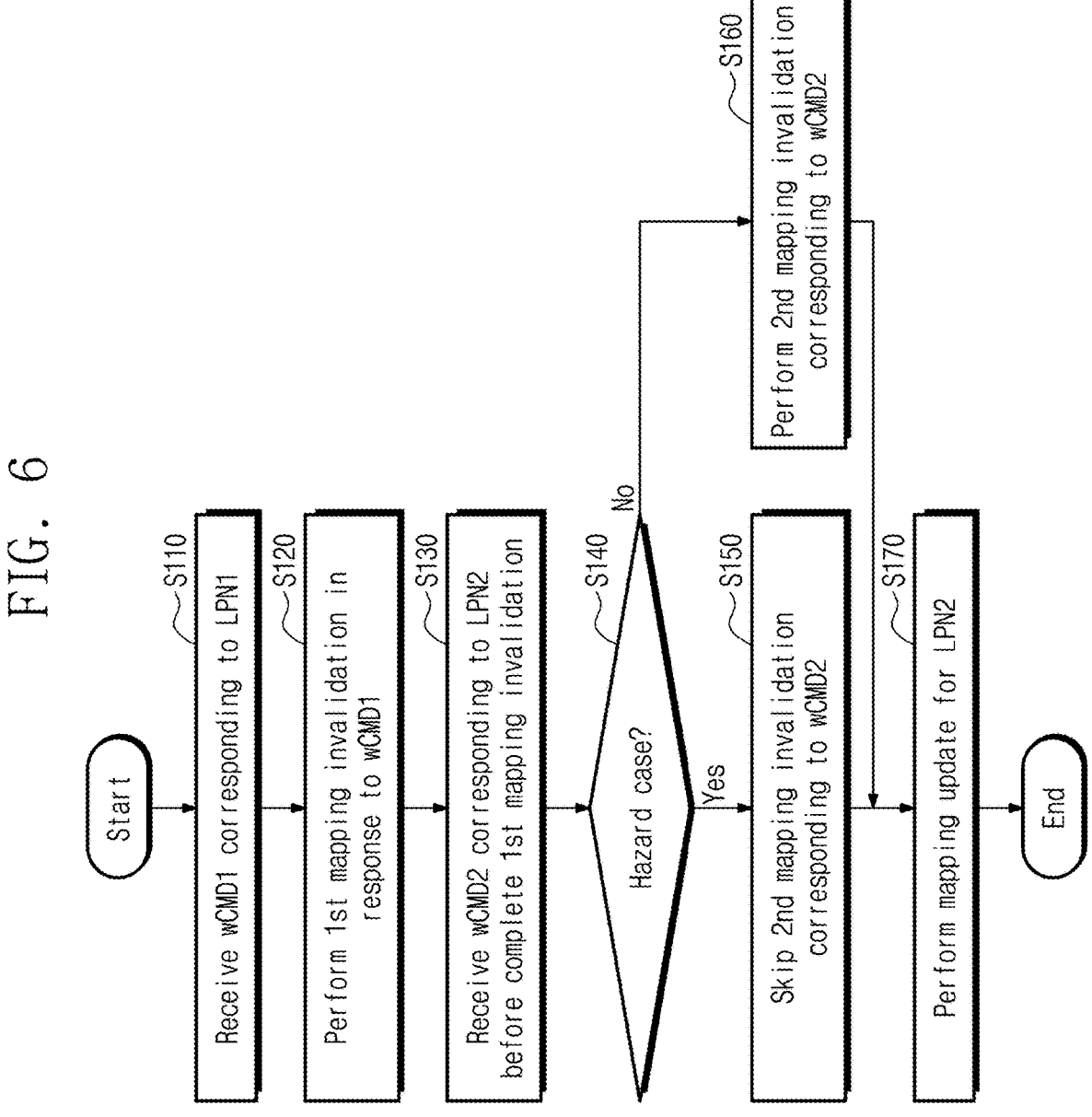
FIG. 6 is a flowchart describing an operation of a storage controller of FIG. 1 according to some example embodiments.

FIG. 6 is a flowchart describing an operation of a storage controller of FIG. 1 according to some example embodiments. FIG. 6 will be described with reference to FIGS. 1 to 4B. Referring to FIG. 6, in operation S110, the storage controller 110 may receive the first write command wCMD1 corresponding to the first logical address LPN1 from the host 11. For example, the first logical address LPN1 may be included in a first logical address range (e.g., LAR1 of FIG. 3). In some example embodiments, when the storage device 100 receives the first write command wCMD1, the trim bit corresponding to the first logical address range (e.g., LAR1 of FIG. 3) may be in an activated state.

According to some example embodiments, before operation S110, the storage controller 110 may include receiving the trim command from the host 11 and activating the trim bit corresponding to the first logical address range LAR1 based on the trim command. In some example embodiments, a trim target address of the trim command may include all the logical addresses LPN1 to LPN4 of the first logical address range LAR1.

In operation S120, the storage controller 110 may perform first mapping invalidation for the first logical address range (e.g., LAR1 of FIG. 3) in response to the first write command wCMD1. The first mapping invalidation may include mapping invalidation for all the logical addresses LPN1 to LPN4 belonging to the first logical address range (e.g., LAR1).

In operation S130, the storage controller 110 may receive the second write command wCMD2. For example, before the first mapping invalidation is completed, the storage controller 110 may receive the second write command wCMD2. The second write command wCMD2 may correspond to the second logical address LPN2. In some example embodiments, the second logical address LPN2 may be included in the first logical address range (e.g., LAR1 of FIG. 3).

In operation S140, the storage controller 110 may determine whether it is a hazard case. For example, when it is determined that the hazard is capable of being caused by the second write command wCMD2 ("Yes" in operation S140), the storage controller 110 may perform operation S150. When it is determined that the hazard is incapable of being caused by the second write command wCMD2 ("No" in operation S140), the storage controller 110 may perform operation S160.

In some example embodiments, when the logical address LPN1 corresponding to the first write command wCMD1 and the logical address LPN2 corresponding to the second write command wCMD2 are included in the same logical address range LAR1 and the second write command wCMD2 is received before the first mapping invalidation is completed, the storage controller 110 may determine that the hazard is capable of being caused by the second write command wCMD2. In other words, in some example embodiments, the storage controller 110 may determine that it is a hazard case.

In some example embodiments, when information indicating that the trim bit corresponding to the second logical address LPN2 is in an activated state and is included in the first logical address range LAR1 together with the second logical address LPN2 is present in a hazard table (e.g., HT of FIG. 1), the storage controller 110 may determine that the hazard is capable of being caused by the second write command wCMD2. In other words, in some example embodiments, the storage controller 110 may determine that it is a hazard case.

In other words, in some example embodiments, a hazard case may refer to a case in which a write command for a logical address corresponding to an activated trim bit is received before completing mapping invalidation for the logical addresses corresponding to the activated trim bit.

In operation S150, the storage controller 110 may skip second mapping invalidation corresponding to the second write command wCMD2. The storage controller 110 may determine that the hazard is capable of being caused by the second write command wCMD2. In some example embodiments, the storage controller 110 may not perform the second mapping invalidation corresponding to the second write command wCMD2 in association with all the logical addresses LPN1 to LPN4 included in the first logical address range LAR1.

In operation S160, the storage controller 110 may perform the second mapping invalidation in response to the second write command wCMD2. For example, when the trim bit is in a deactivated state at the time of receiving the second write command wCMD2, the storage controller 110 may perform mapping invalidation for the second logical address LPN2.

In operation S170, the storage controller 110 may perform mapping update for the second logical address LPN2. The storage controller 110 may map a new physical address to the second logical address LPN2. In some example embodiments, after the mapping invalidation based on the first write command wCMD1 is received, the storage controller 110 may perform the mapping update for the second logical address LPN2.

As described above, according to some example embodiments, when the hazard is capable of being caused by a write command (e.g., wCMD2), the storage controller 110 may skip mapping invalidation based on the write command (e.g., wCMD2). Accordingly, according to some example embodiments, the mapping invalidation may be prevented from being duplicated and performed.

Figure 7:
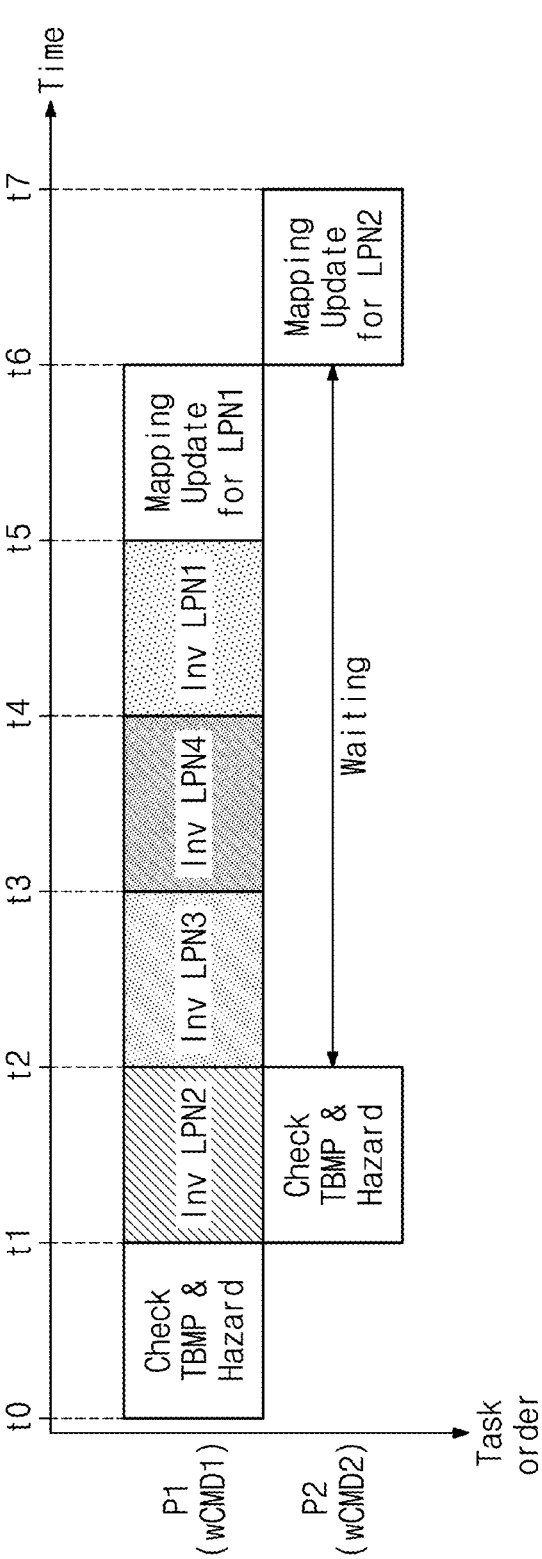
FIG. 7 is a diagram describing an operation of a storage controller of FIG. 1 according to some example embodiments.

FIG. 7 is a diagram describing an operation of a storage controller of FIG. 1 according to some example embodiments. FIG. 7 will be described with reference to FIGS. 1 to 6. Referring to FIG. 7, at the 0-th point in time to, the storage controller 110 may receive the first write command wCMD1 corresponding the first logical address LPN1 included in the first logical address range LAR1 corresponding to the activated trim bit. As described with reference to FIGS. 5A and 5B, the storage controller 110 may perform the first process P1 during the time period from t0 to t6 in response to the first write command wCMD1.

For example, during the time period from t0 to t1, the storage controller 110 may check the trim bitmap TBMP. Also, the storage controller 110 may check whether the hazard based on the first write command wCMD1 is capable of being caused. For example, when the first write command wCMD1 is received, the mapping invalidation for the first logical address range LAR1 may not be under execution. In some example embodiments, the storage controller 110 may determine that the hazard based on the first write command wCMD1 is incapable of being caused.

Accordingly, during the time period from t1 to t5, the storage controller 110 may perform the first mapping invalidation for the logical addresses LPN1 to LPN4 included in the first logical address range LAR1. Afterwards, during the time period from t5 to t6, the storage controller 110 may perform mapping update for the first logical address LPN1.

In some example embodiments, at the first point in time t1, the storage controller 110 may receive the second write command wCMD2 corresponding to the second logical address LPN2. The first logical address LPN1 and the second logical address LPN2 may be included in the first logical address range LAR1. For example, the first mapping invalidation may not be completed at the first point in time t1. In response to the second write command wCMD2, the storage controller 110 may perform the second process P2 during the time period from t1 to t7.

During the time period from t1 to t2, the storage controller 110 may check the trim bitmap TBMP and may check whether the hazard based on the second write command wCMD2 is capable of being caused. During the time period from t1 to t2, the trim bit corresponding to the second logical address LPN2 may be in an activated state. Also, the first mapping invalidation may not be completed. In some example embodiments, the storage controller 110 may determine that the hazard based on the second write command wCMD2 is capable of being caused.

Accordingly, in some example embodiments, unlike the cases of FIGS. 5A and 5B, the storage controller 110 may skip the second mapping invalidation based on the second write command wCMD2. The storage controller 110 may wait until the mapping update for the first logical address LPN1 is completed. After the mapping update for the first logical address LPN1 is completed, the storage controller 110 may only perform the mapping update for the second logical address LPN2. According to some example embodiments, the mapping invalidation for the logical addresses LPN1 to LPN4 may not be duplicated and performed. Accordingly, the performance of the storage controller 110 may be improved.

Figure 8:
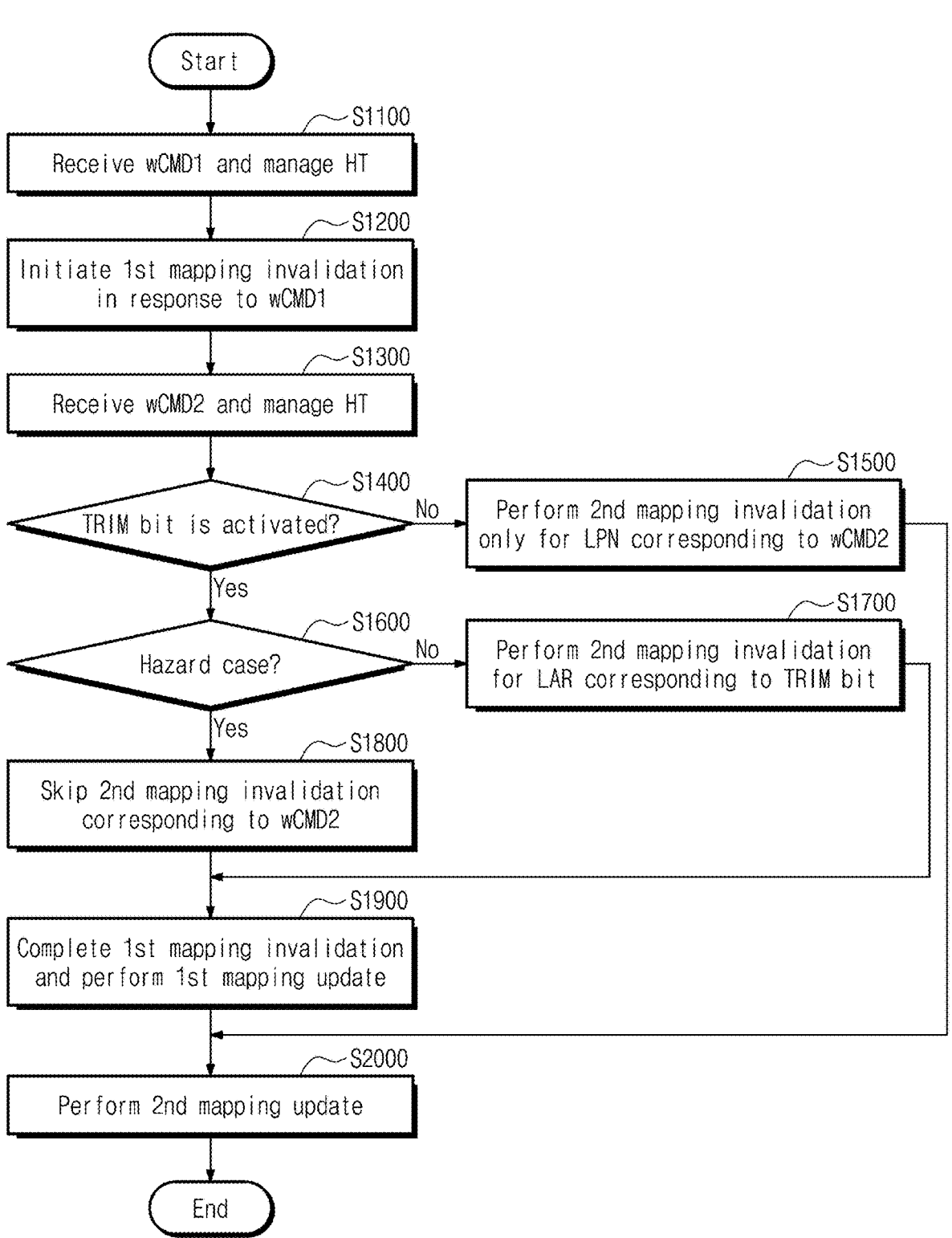
FIG. 8 is a flowchart describing an operation of a storage controller of FIG. 1 according to some example embodiments.

FIG. 8 is a flowchart describing an operation of a storage controller of FIG. 1 according to some example embodiments. FIG. 8 will be described with reference to FIGS. 1 to 4B, 6, and 7. Referring to FIG. 8, in operation S1100, the storage controller 110 may receive the first write command wCMD1 from the host 11 and may manage the hazard table HT.

For example, the first write command wCMD1 may correspond to the first logical address LPN1 included in the first logical address range LAR1. Also, the trim bit corresponding to the first logical address range LAR1 may be in an activated state. In some example embodiments, the storage controller 110 may update the hazard table HT. For example, the storage controller 110 may store information about the first logical address LPN1 in the hazard table HT.

In operation S1200, the storage controller 110 may initiate the first mapping invalidation in response to the first write command wCMD1. The storage controller 110 may initiate the first mapping invalidation for the first logical address range LAR1. The first mapping invalidation may include the mapping invalidation for the logical addresses LPN1 to LPN4.

In operation S1300, the storage controller 110 may receive the second write command wCMD2 and may manage the hazard table HT. For example, the second write command wCMD2 may correspond to the second logical address LPN2 included in the first logical address range (e.g., LAR1 of FIG. 3). In some example embodiments, the storage controller 110 may store information about the second logical address LPN2 in the hazard table HT.

In some example embodiments, the storage controller 110 may check that the information about the second logical address LPN2 is present in the hazard table HT. For example, the storage controller 110 may recognize that the execution of the second mapping invalidation based on the second write command wCMD2 is not completed.

In operation S1400, the storage controller 110 may determine whether the trim bit is in an activated state. For example, the storage controller 110 may determine whether the trim bit corresponding to a logical address associated with the second write command wCMD2 is in an activated state. When the trim bit is not in an activated state ("No" in operation S1400), the storage controller 110 may perform operation S1500. When the trim bit is in an activated state ("Yes" in operation S1400), the storage controller 110 may perform operation S1600.

In operation S1500, the storage controller 110 may only perform the second mapping invalidation corresponding to the second write command wCMD2. For example, like the example of FIG. 4B, the second write command wCMD2 may correspond to the fifth logical address LPN5. Also, the trim bit corresponding to the fifth logical address LPN5 may be in a deactivated state. In some example embodiments, the storage controller 110 may only perform the second mapping invalidation for the fifth logical address LPN5.

In operation S1600, the storage controller 110 may determine whether it is a hazard case. For example, the storage controller 110 may determine that the hazard is capable of being caused by the second write command wCMD2. When it is determined that the hazard is incapable of being caused by the second write command wCMD2 ("No" in operation S1600), the storage controller 110 may perform operation S1700. When it is determined that the hazard is capable of being caused by the second write command wCMD2 ("Yes" in operation 1600), the storage controller 110 may perform operation S1800.

In some example embodiments, a hazard case may refer to a case in which a write command for a logical address corresponding to an activated trim bit is received before completing mapping invalidation for the logical addresses corresponding to the activated trim bit.

In some example embodiments, information about a logical address (e.g., the first logical address LPN1) included in the same logical address range (e.g., LAR1) as the logical address (e.g., LPN2) corresponding to the second write command wCMD2 may be present in the hazard table HT. In some example embodiments, the storage controller 110 may check that the first mapping invalidation associated with the logical address (e.g., LPN2) corresponding to the second write command wCMD2 is not completed. Accordingly, the storage controller 110 may determine that the hazard is capable of being caused by the second write command wCMD2.

In some example embodiments, information about a logical address (e.g., the sixth logical address LPN6) included in the same logical address range (e.g., LAR2) as the logical address (e.g., LPN5) corresponding to the second write command wCMD2 may be absent from the hazard table HT. In some example embodiments, the storage controller 110 may check that the first mapping invalidation associated with the logical address (e.g., LPN5) corresponding to the second write command wCMD2 is not under execution. Accordingly, the storage controller 110 may determine that the hazard is incapable of being caused by the second write command wCMD2.

In operation S1700, the storage controller 110 may perform the second mapping invalidation for a logical address range corresponding to the trim bit. For example, the second write command wCMD2 may correspond to the fifth logical address LPN5. Also, the trim bit corresponding to the fifth logical address LPN5 may be in an activated state. In some example embodiments, when the second write command wCMD2 is received, information about a logical address (e.g., the sixth logical address LPN6) included in the same logical address range LAR2 as the fifth logical address LPN5 may be absent from the hazard table HT. In some example embodiments, for example, the storage controller 110 may determine that there is no hazard case and may then perform the second mapping invalidation for the second logical address range LAR2 corresponding to the activated trim bit.

In operation S1800, the storage controller 110 may skip the second mapping invalidation corresponding to the second write command wCMD2. For example, the second write command wCMD2 may correspond to the second logical address LPN2. Also, the trim bit corresponding to the second logical address LPN2 may be in an activated state. In some example embodiments, when the second write command wCMD2 is received, information about a logical address (e.g., the first logical address LPN1) included in the same logical address range LAR1 as the second logical address LPN2 may be present in the hazard table HT. In some example embodiments, for example, the storage controller 110 may determine that the hazard is capable of being caused by the second write command wCMD2. Accordingly, the storage controller 110 may skip the second mapping invalidation based on the second write command wCMD2.

In operation S1900, the storage controller 110 may complete the first mapping invalidation. Also, the storage controller 110 may perform first mapping update for the first logical address LPN1 corresponding to the first write command wCMD1. In some example embodiments, after the storage controller 110 completes the first mapping update, the storage controller 110 may delete the information about the logical address (e.g., LPN1) corresponding to the first write command wCMD1 from the hazard table HT.

In operation S2000, the storage controller 110 may perform second mapping update for the logical address (e.g., LPN2) corresponding to the second write command wCMD2. In some example embodiments, after the storage controller 110 completes the second mapping update, the storage controller 110 may delete the information about the logical address (e.g., LPN2) corresponding to the second write command wCMD2 from the hazard table HT.

For example, operation S1100 of FIG. 8 may correspond to operation S110 of FIG. 6; operation S1200 of FIG. 8 may correspond to operation S120 of FIG. 6; operation S1300 of FIG. 8 may correspond to operation S130 of FIG. 6; operation S1600 of FIG. 8 may correspond to operation S140 of FIG. 6; operation S1800 of FIG. 8 may correspond to operation S150 of FIG. 6; operation S1700 of FIG. 8 may correspond to operation S160 of FIG. 6; and, operation S2000 of FIG. 8 may correspond to operation S170 of FIG. 6.

Figure 9A:
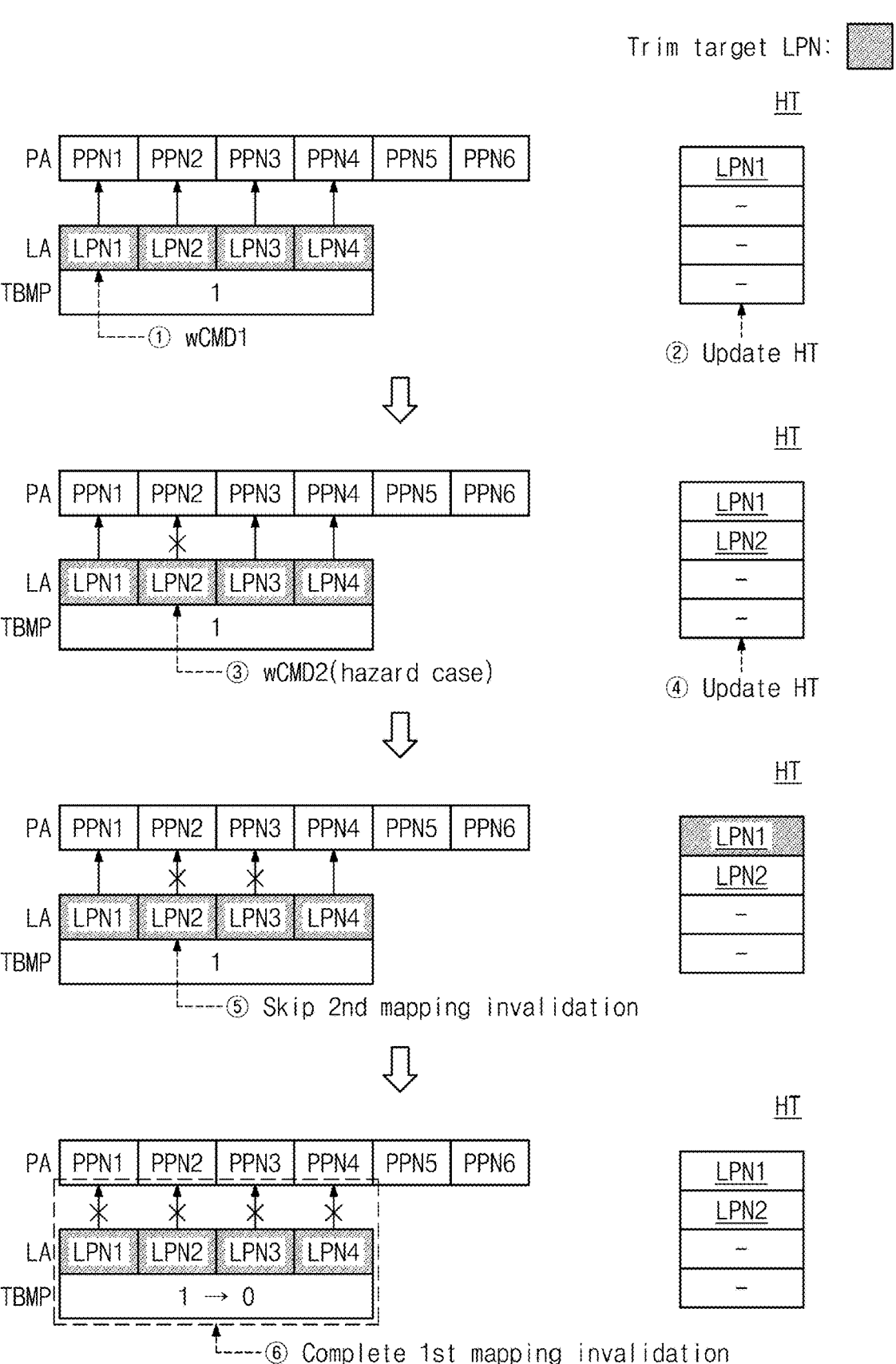
FIGS. 9A and 9B are diagrams describing an example of an operation of the storage controller 110 of FIG. 1 according to some example embodiments.
Figure 9B:
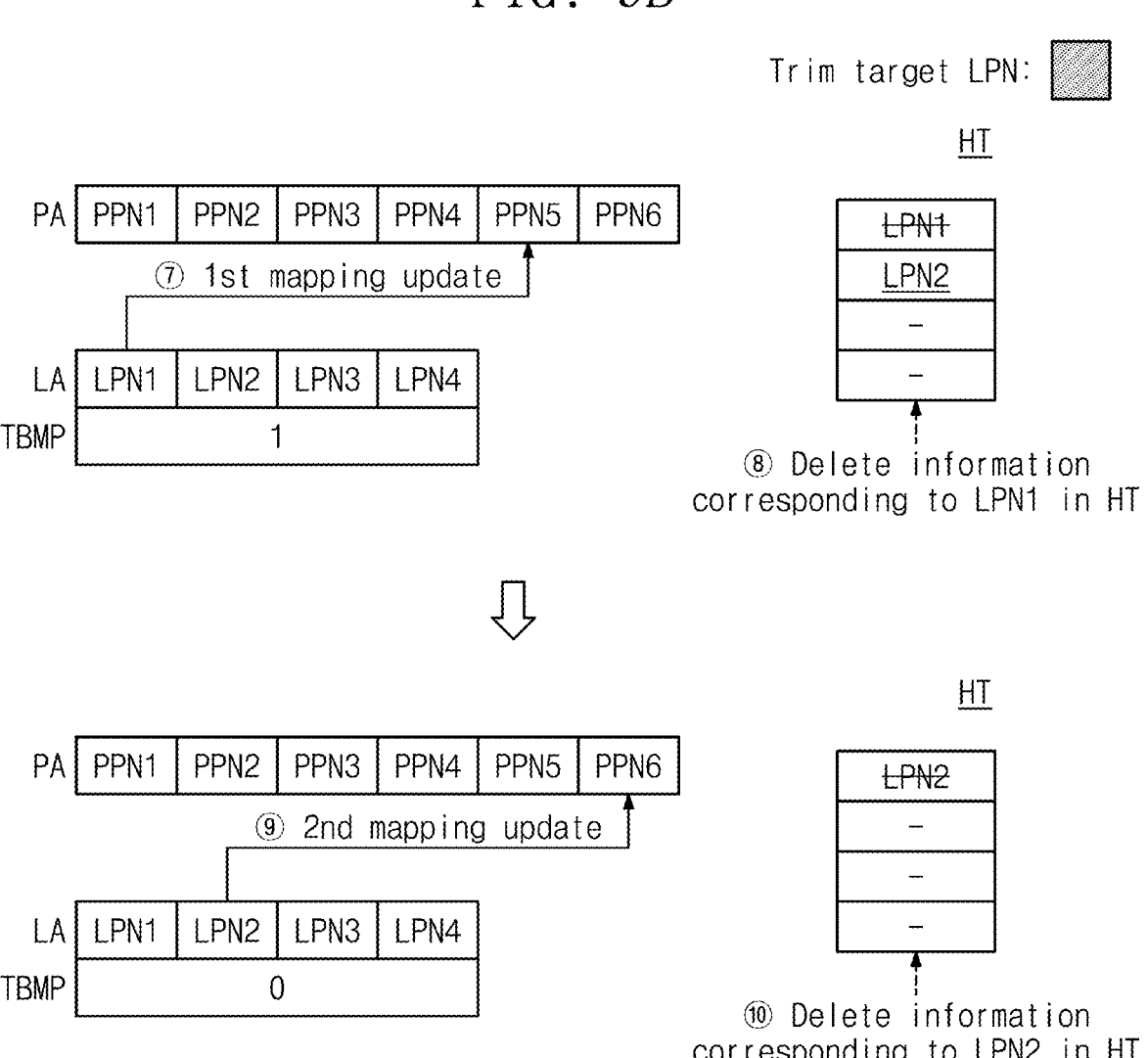

FIGS. 9A and 9B are diagrams describing an example of an operation of the storage controller 110 of FIG. 1 according to some example embodiments. FIGS. 9A and 9B will be described with reference to FIGS. 1 to 8. Referring to FIGS. 9A and 9B, before a first operation ① is performed, the trim bit corresponding to the first logical address range LAR1 may be in a state of being activated by the trim command from the host 11. In some example embodiments, the first logical address range LAR1 may include the first to fourth logical addresses LPN1 to LPN4.

For example, the first logical address LPN1 may correspond to a first physical address PPN1, the second logical address LPN2 may correspond to a second physical address PPN2, the third logical address LPN3 may correspond to a third physical address PPN3, and the fourth logical address LPN4 may correspond to a fourth physical address PPN4.

In the first operation ①, the storage controller 110 may receive the first write command wCMD1. The storage controller 110 may receive the first write command wCMD1 after the storage controller 110 activates the trim bit and before the storage controller 110 enters the idle time. The first write command wCMD1 may correspond to the first logical address LPN1. When the first write command wCMD1 is received, the hazard table HT may not include information about any logical address.

Accordingly, in a second operation ②, the storage controller 110 may update the hazard table HT. The storage controller 110 may store information about the first logical address LPN1 corresponding to the first write command wCMD1 in the hazard table HT.

For example, the storage controller 110 may perform the second operation ② and may then check the trim bitmap TBMP. The storage controller 110 may initiate first mapping invalidation for the first logical address range LAR1, based on that the trim bit corresponding to the first logical address LPN1 is in an activated state.

Afterwards, in a third operation ③, the storage controller 110 may receive the second write command wCMD2. The storage controller 110 may receive the second write command wCMD2 before the first mapping invalidation based on the first write command wCMD1 is completed. For example, the storage controller 110 may receive the second write command wCMD2 after receiving the first write command wCMD1 and before completing the first mapping invalidation.

In a fourth operation ④, the storage controller 110 may update the hazard table HT. The storage controller 110 may store information about the second logical address LPN2 corresponding to the second write command wCMD2 in the hazard table HT.

In a fifth operation ⑤, the storage controller 110 may skip the execution of mapping invalidation based on the second write command wCMD2. The storage controller 110 may determine that the hazard based on the second write command wCMD2 is capable of being caused, based on the trim bitmap TBMP and the hazard table HT and may then skip the execution of second mapping invalidation.

For example, when the second write command wCMD2 is received, the trim bit corresponding to the second logical address LPN2 may be in an activated state. Also, the hazard table HT may include information about the first logical address LPN1 included in the first logical address range LAR1 together with the second logical address LPN2. In some example embodiments, the storage controller 110 may recognize that the first mapping invalidation based on the first write command wCMD1 is not completed, by checking the trim bitmap TBMP and the hazard table HT. Accordingly, the storage controller 110 may determine that the hazard based on the second write command wCMD2 is capable of being caused, and the storage controller 110 may skip the second mapping invalidation.

For example, the storage controller 110 may receive the first write command wCMD1 for the first logical address LPN1 corresponding to the activated trim bit (in the first operation ①. After the storage controller 110 receives the first write command wCMD1, the storage controller 110 may receive the second write command wCMD2 for the second logical address LPN2 before the first mapping invalidation is completed (in the third operation ③). In some example embodiments, the storage controller 110 may determine that the hazard based on the second write command wCMD2 is capable of being caused and may skip the second mapping invalidation (in the fifth operation ⑤).

In a sixth operation ⑥, the storage controller 110 may complete the execution of the first mapping invalidation. Accordingly, a mapping relationship of the logical addresses LPN1 to LPN4 included in the first logical address range LAR1 may be released. This may mean that data corresponding to the first to fourth physical addresses PPN1 to PPN4 are invalid data.

Referring to FIG. 9B, in a seventh operation ⑦, the storage controller 110 may perform first mapping update. For example, the storage controller 110 may map the first logical address LPN1 to a fifth physical address PPN5. For example, the fifth physical address PPN5 may be an address at which first write data corresponding to the first write command wCMD1 are stored.

In an eighth operation ⑧, the storage controller 110 may update the hazard table HT. For example, after the storage controller 110 completes the first mapping update, the storage controller 110 may delete the information corresponding to the first logical address LPN1 from the hazard table HT.

In a ninth operation ⑨, the storage controller 110 may perform second mapping update. The storage controller 110 may map the second logical address LPN2 to a sixth physical address PPN6. For example, the sixth physical address PPN6 may be an address at which the first write data corresponding to the second write command wCMD2 are stored.

Afterwards, in a tenth operation ⑩, the storage controller 110 may update the hazard table HT. For example, after the storage controller 110 completes the first mapping update, the storage controller 110 may delete the information about the second logical address LPN2 from the hazard table HT.

In some example embodiments, unlike the example illustrated in FIG. 9B, the storage controller 110 may receive a third write command while performing the second mapping update (i.e., during the execution of the ninth operation ⑨). The third write command may correspond to the second logical address LPN2. In some example embodiments, the storage controller 110 may check that the information about the second logical address LPN2 is present in the hazard table HT. Accordingly, until the execution of the second mapping update based on the second write command wCMD2 is completed (i.e., until the tenth operation ⑩ is completed), the storage controller 110 may wait without processing the third write command.

Figure 10:
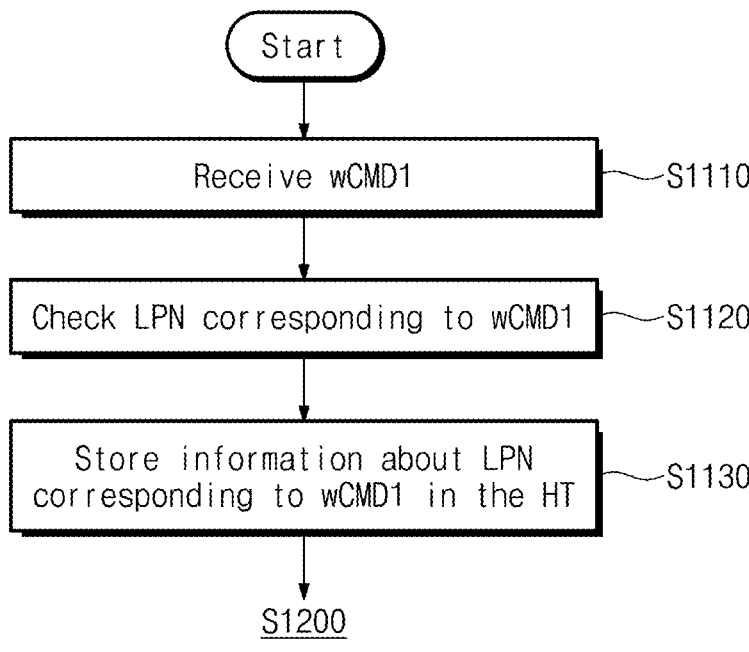
FIG. 10 is a diagram describing operation S1100 of FIG. 8 according to some example embodiments.

FIG. 10 is a diagram describing operation S1100 of FIG. 8 according to some example embodiments. FIG. 10 will be described with reference to FIGS. 1 to 8. Referring to FIG. 10, in operation S1110, the storage controller 110 may receive the first write command wCMD1.

In operation S1120, the storage controller 110 may check a logical address (e.g., the first logical address LPN1) corresponding to the first write command wCMD1.

In operation S1130, the storage controller 110 may store information about the logical address (e.g., the first logical address LPN1) corresponding to the first write command wCMD1 in the hazard table HT.

FIG. 10 is described based on operation S1100 of FIG. 8, but example embodiments are not limited thereto. For example, even when the storage controller 110 receives the second write command wCMD2 in operation S1300 of FIG. 8, the storage controller 110 may manage the hazard table HT in the same manner as illustrated in FIG. 10. For example, after the storage controller 110 receives the second write command wCMD2, the storage controller 110 may store information about a logical address (e.g., the second logical address LPN2) corresponding to the second write command wCMD2 in the hazard table HT.

As described above, according to some example embodiments, based on the hazard table HT, the storage controller 110 may determine whether there is a probability of hazard occurrence. For example, when the storage controller 110 receives the write command, the storage controller 110 may determine whether there is a probability of hazard occurrence, based on whether information about a logical address belonging to the same logical address range as a logical address corresponding to the write command is present in the hazard table HT. For example, based on the hazard table HT, the storage controller 110 may check whether mapping invalidation based on a past write command is completed.

Figure 11:
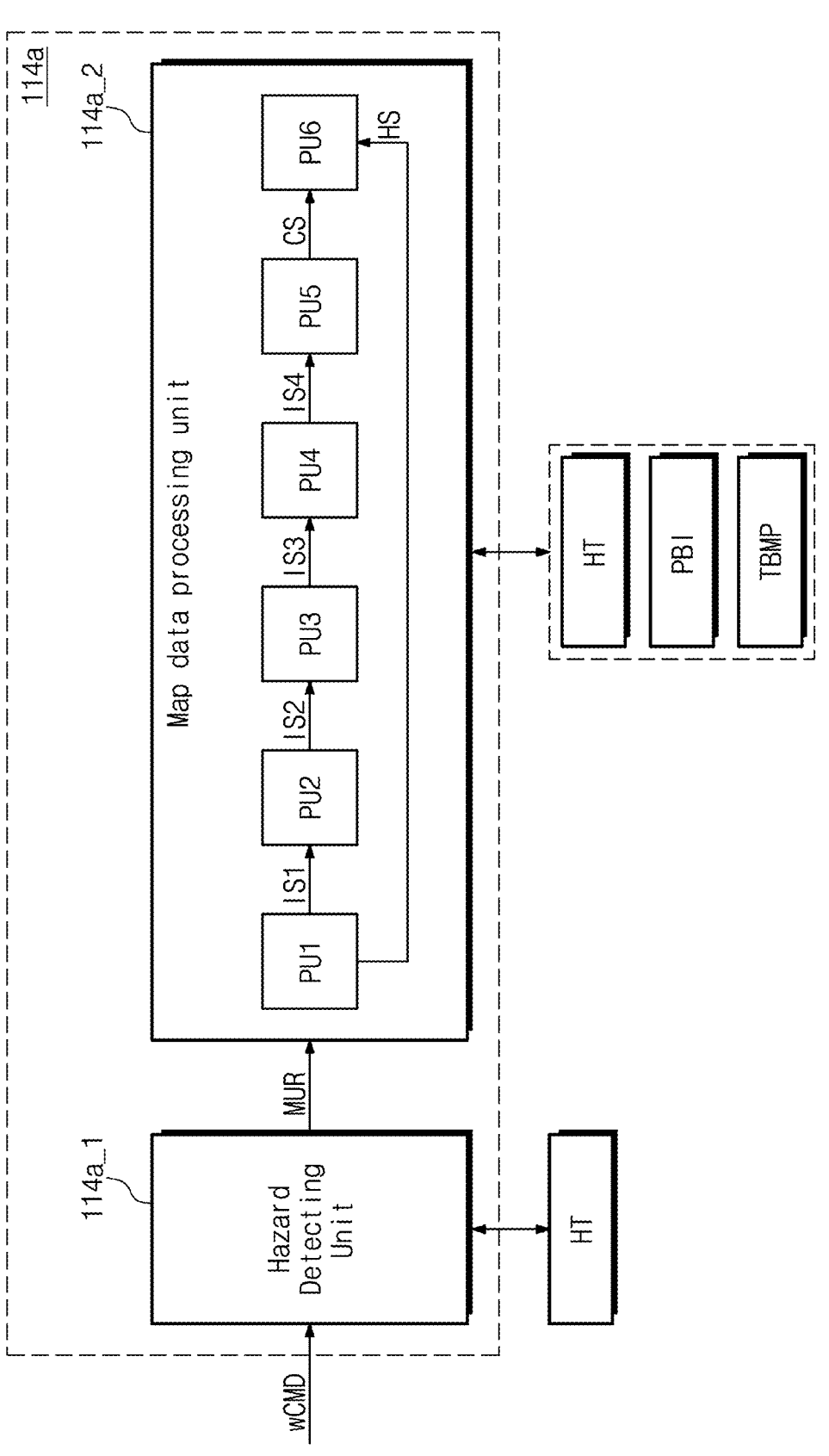
FIG. 11 is a block diagram describing an operation of a map data manager of FIG. 1 according to some example embodiments.

FIG. 11 is a block diagram describing an operation of a map data manager of FIG. 1 according to some example embodiments. FIG. 11 will be described with reference to FIGS. 1 to 10. Referring to FIG. 11, the map data manager 114*a* may include a hazard detecting unit 114*a*_1 and a map data processing unit 114*a*_2.

The hazard detecting unit 114*a*_1 may receive a write command wCMD from the host 11. The hazard detecting unit 114*a*_1 may generate a map data update request signal MUR based on the write command wCMD. The hazard detecting unit 114*a*_1 may transmit, provide, or send the map data update request signal MUR to the map data processing unit 114*a*_2. The map data update request signal MUR may include hazard detection information. The hazard detection information may mean information about whether the hazard based on the write command wCMD is capable of being caused. The hazard detecting unit 114*a*_1 may generate the hazard detection information by referring to the hazard table HT. The hazard detecting unit 114*a*_1 may manage the hazard table HT.

In some example embodiments, the hazard detecting unit 114*a*_1 may receive the write command wCMD corresponding to the first logical address LPN1. The hazard detecting unit 114*a*_1 may check the hazard table HT. The hazard table HT may not include information about the first logical address LPN1. In some example embodiments, the hazard detecting unit 114*a*_1 may generate the hazard detection information including information indicating that the hazard based on the write command wCMD is incapable of being caused. In some example embodiments, the hazard detecting unit 114*a*_1 may transmit, provide, or send the map data update request signal MUR including the hazard detection information to the map data processing unit 114*a*_2. In some example embodiments, the hazard detecting unit 114*a*_1 may store information about the first logical address range LAR1 including the first logical address LPN1 in the hazard table HT.

In some example embodiments, the hazard detecting unit 114*a*_1 may receive the write command wCMD corresponding to the second logical address LPN2. The hazard detecting unit 114*a*_1 may check the hazard table HT. The hazard table HT may include information about at least one of the logical addresses LPN1 to LPN4 of the first logical address range LAR1 in which the first logical address LPN1 is included. In some example embodiments, the hazard detecting unit 114*a*_1 may check that mapping invalidation for the first logical address range LAR1 is not completed and may generate the hazard detection information including information indicating that the hazard based on the write command wCMD is capable of being caused. In some example embodiments, the hazard detecting unit 114*a*_1 may transmit, provide, or send the map data update request signal MUR including the hazard detection information to the map data processing unit 114*a*_2.

The map data processing unit 114*a*_2 may receive the map data update request signal MUR. The map data processing unit 114*a*_2 may perform mapping invalidation and mapping update based on the map data update request signal MUR. For example, the map data processing unit 114*a*_2 may perform mapping invalidation and mapping update by referring to the mapping table MT, the physical address information PBI, and the trim bitmap TBMP stored in the volatile memory device 130 (refer to FIG. 2).

The map data processing unit 114*a*_2 may include a first processing unit PU1 to a sixth processing unit PU6. The first processing unit PU1 may check whether the trim bit is in an activated state and whether the hazard is capable of being caused by the write command wCMD. Each of the second processing unit PU2 to the fifth processing unit PU5 may perform mapping invalidation for a logical address range including a logical address corresponding to the write command wCMD. The sixth processing unit PU6 may perform mapping update for the logical address corresponding to the write command wCMD. In some example embodiments, at least a part of the hazard detecting unit 114*a*_1, the map data processing unit 114*a*_2, and the first processing unit PU1 to the sixth processing unit PU6 may include or be implemented as respective processing circuitries such as hardware (e.g., logic circuits) or a combination of hardware and software (e.g., a computer-based electronic system) like a processor executing instruction codes or program routines (e.g., a software program).

In some example embodiments, the first processing unit PU1 may check the trim bitmap TBMP in response to the map data update request signal MUR. For example, the write command wCMD may correspond to the first logical address LPN1. The first processing unit PU1 may check that the trim bit corresponding to the first logical address LPN1 is in an activated state. The first processing unit PU1 may check the hazard detection information of the map data update request signal MUR. The hazard detection information may include information indicating that the hazard based on the write command wCMD is incapable of being caused. In some example embodiments, the first processing unit PU1 may determine that the hazard is incapable of being caused by the write command wCMD. Also, the first processing unit PU1 may transmit, provide, or send a first invalidation signal IS1 to the second processing unit PU2.

In some example embodiments, the second processing unit PU2 may perform mapping invalidation for the second logical address LPN2 and may transmit, provide, or send a second invalidation signal IS2 to the third processing unit PU3. In response to the second invalidation signal IS2, the third processing unit PU3 may perform mapping invalidation for the third logical address LPN3 and may transmit, provide, or send a third invalidation signal IS3 to the fourth processing unit PU4. In response to the third invalidation signal IS3, the fourth processing unit PU4 may perform mapping invalidation for the fourth logical address LPN4 and may transmit, provide, or send a fourth invalidation signal IS4 to the fifth processing unit PU5. In response to the fourth invalidation signal IS4, the fifth processing unit PU5 may perform mapping invalidation for the first logical address LPN1 and may transmit, provide, or send a completion signal CS to the sixth processing unit PU6. The sixth processing unit PU6 may perform mapping update for the first logical address LPN1 in response to the completion signal CS.

For example, when the first processing unit PU1 transmits, provides, or sends the first invalidation signal IS1, each of the second processing unit PU2 to the fifth processing unit PU5 may perform mapping invalidation, and the sixth processing unit PU6 may perform mapping update.

In some example embodiments, the first processing unit PU1 may check the trim bitmap TBMP in response to the map data update request signal MUR. For example, the write command wCMD may correspond to the second logical address LPN2. The first processing unit PU1 may check that the trim bit corresponding to the second logical address LPN2 is in an activated state. The first processing unit PU1 may check the hazard detection information of the map data update request signal MUR. The hazard detection information may include information indicating that the hazard is capable of being caused by the write command wCMD. Accordingly, the first processing unit PU1 may determine that the hazard is capable of being caused by the write command wCMD. In some example embodiments, the first processing unit PU1 may not transmit, provide, or send the first invalidation signal IS1 to the second processing unit PU2 and may transmit, provide, or send a hazard signal HS to the sixth processing unit PU6. In some example embodiments, the sixth processing unit PU6 may perform mapping update for the second logical address LPN2 in response to the hazard signal HS.

In other words, when the hazard is capable of being caused by the write command wCMD, the first processing unit PU1 may transmit, provide, or send the hazard signal HS to the sixth processing unit PU6 without transmitting, providing, or sending the first invalidation signal IS1 to the second processing unit PU2. Accordingly, the mapping invalidation based on the write command wCMD may be skipped. This may mean that mapping invalidation for a logical address is not duplicated and performed.

According to some example embodiments, when a hazard is capable of being caused by a write command, a storage controller may skip a mapping invalidation operation based on the write command. Accordingly, a storage controller configured to control a non-volatile memory device with improved performance, an operation method thereof, and a storage device including the storage controller may be provided.

While the present inventive concepts have been described with reference to some example embodiments thereof, it will be apparent to those of ordinary skill in the art that various changes and modifications may be made thereto without departing from the spirit and scope of the present inventive concepts as set forth in the following claims.

What is claimed is:

1. An operation method of a storage controller configured to control a non-volatile memory device, the method comprising:

receiving a first write command for a first logical address included in a first logical address range corresponding to a first trim bit from an external host, the first trim bit being in an activated state in response to determining that the first write command is received;

initiating a first mapping invalidation for the first logical address range in response to the first write command;

before the first mapping invalidation is complete, receiving a second write command corresponding to a second logical address included in the first logical address range from the external host;

skipping a second mapping invalidation corresponding to the second write command; and after the first mapping invalidation is complete, performing a mapping update for the second logical address.

2. The operation method of claim 1, wherein, in response to determining that the second write command is received, the first trim bit is in the activated state.

3. The operation method of claim 1, wherein the activated state of the first trim bit indicates that the first logical address range is targeted for mapping invalidation.

4. The operation method of claim 1, wherein the receiving of the first write command is performed after the first trim bit is activated and before the storage controller enters an idle time.

5. The operation method of claim 2, further comprising:

after the first mapping invalidation is complete, performing a mapping update for the first logical address, wherein the mapping update for the second logical address is performed after the mapping update for the first logical address is complete.

6. The operation method of claim 5, wherein the storage controller includes:

a hazard table including information about a logical address corresponding to a write command.

7. The operation method of claim 6, further comprising:

after the receiving of the first write command, storing information corresponding to the first logical address in the hazard table.

8. The operation method of claim 7, further comprising:

after the receiving of the second write command, determining that a hazard is caused by the second write command, based on the first trim bit being in the activated state and the information corresponding to the first logical address being present in the hazard table.

9. The operation method of claim 6, further comprising:

after the first mapping invalidation is complete and the mapping update for the first logical address is performed, deleting information corresponding to the first logical address from the hazard table.

10. The operation method of claim 2, wherein the storage controller is configured to handle pieces of data corresponding to the first logical address range corresponding to the first trim bit of the activated state as invalid data.

11. The operation method of claim 2, wherein the first logical address range includes the first logical address and the second logical address, and wherein the method further comprises:

in response to determining that the second write command is received, determining that a hazard is caused by the second write command based on the first mapping invalidation not being complete.

12. A storage device, comprising:

a non-volatile memory device; and a storage controller configured to control the non-volatile memory device, the storage controller configured to receive a first write command for a first logical address included in a first logical address range corresponding to a first trim bit from an external host, initiate a first mapping invalidation for the first logical address range in response to the first write command, receive a second write command corresponding to a second logical address included in the first logical address range from the external host before the first mapping invalidation is complete, skip a second mapping invalidation corresponding to the second write command, and perform a mapping update for the second logical address after the first mapping invalidation is complete.

13. The storage device of claim 12, wherein, in response to determining that the first write command is received, the first trim bit is in an activated state, and wherein, in response to determining that the second write command is received, the first trim bit is in the activated state.

14. The storage device of claim 13, wherein the storage controller includes:

a hazard table including information about a logical address corresponding to a write command.

15. The storage device of claim 14, wherein, after the first write command is received, the storage controller is further configured to:

store information corresponding to the first logical address in the hazard table.

16. The storage device of claim 15, wherein, after the second write command is received, the storage controller is further configured to:

determine that a hazard is caused by the second write command based on the first trim bit being in the activated state and the information corresponding to the first logical address being present in the hazard table.

17. The storage device of claim 12, wherein the storage controller is further configured to:

receive a third write command for a third logical address included in a second logical address range corresponding to a second trim bit from the external host while performing the first mapping invalidation; and in response to determining that the second trim bit is in an activated state at a time of receiving the third write command, perform third mapping invalidation for the second logical address range in response to the third write command.

18. The storage device of claim 12, wherein the storage controller is further configured to:

receive a third write command for a third logical address included in a second logical address range corresponding to a second trim bit from the external host while performing the first mapping invalidation; and in response to determining that the second trim bit is in a deactivated state at a time of receiving the third write command, perform third mapping invalidation for the third logical address among logical addresses included in the second logical address range in response to the third write command.

19. The storage device of claim 12, wherein the storage controller is further configured to:

perform a mapping update for the first logical address after the first mapping invalidation is complete; and perform a mapping update for the second logical address after the mapping update for the first logical address is complete.

20. An operation method of a storage controller configured to communicate with a host and a non-volatile memory device, the method comprising:

activating a first trim bit corresponding to a first logical address range in response to a trim command from the host;

receiving a first write command for a first logical address included in the first logical address range from the host;

initiating a first mapping invalidation for the first logical address range in response to the first write command;

before the first mapping invalidation is complete, receiving a second write command corresponding to a second logical address included in the first logical address range from the host;

in response to determining that the second write command is received, skipping a second mapping invalidation corresponding to the second write command, based on the first trim bit being in an activated state and the first mapping invalidation not being complete;

completing the first mapping invalidation and performing a first mapping update for the first logical address; and after the first mapping update is complete, performing a mapping update for the second logical address.

* * * * *